United States Patent
Ma et al.

(10) Patent No.: US 9,890,632 B2
(45) Date of Patent: Feb. 13, 2018

(54) SYSTEMS, COMPUTER MEDIUM AND COMPUTER-IMPLEMENTED METHODS FOR LOGGING USING A LOGGING TOOL WITH ADJUSTABLE DETECTORS

(71) Applicants: Saudi Arabian Oil Company, Dhahran (SA); Weatherford International, LLC, Houston, TX (US)

(72) Inventors: Shouxiang Ma, Dhahran (SA); Ali R. Belowi, Dhahran (SA); Darryl Trcka, Fort Worth, TX (US)

(73) Assignees: Saudi Arabian Oil Company, Dhahran (SA); Weatherford International, LLC, Houston, TX (US)

( * ) Notice: Subject to any disclaimer, the term of this patent is extended or adjusted under 35 U.S.C. 154(b) by 0 days.

(21) Appl. No.: 14/310,540

(22) Filed: Jun. 20, 2014

(65) Prior Publication Data

US 2015/0369956 A1    Dec. 24, 2015

(51) Int. Cl.
*G01V 5/10* (2006.01)
*E21B 47/12* (2012.01)

(52) U.S. Cl.
CPC .............. *E21B 47/12* (2013.01); *G01V 5/101* (2013.01)

(58) Field of Classification Search
CPC ...................................................... G01V 5/101
USPC .................. 250/265, 267, 269.5, 254, 269.7
See application file for complete search history.

(56) References Cited

U.S. PATENT DOCUMENTS

| | | | |
|---|---|---|---|
| 2,515,501 A | 7/1950 | Fearon et al. | |
| 2,515,534 A | 7/1950 | Thayer et al. | |
| 2,543,675 A | 2/1951 | Swift | |
| 2,953,685 A | 9/1960 | Dewan | |
| 2,963,583 A | 12/1960 | Lebourg | |
| 3,019,341 A | 1/1962 | Monaghan | |
| 3,521,063 A | 7/1970 | Tittman | |

(Continued)

FOREIGN PATENT DOCUMENTS

| GB | 948310 | 1/1964 |
|---|---|---|
| RU | 2447265 C1 | 4/2012 |
| WO | 2013012504 A2 | 1/2013 |

OTHER PUBLICATIONS

Adolph et al. "Saturation Monitoring With the RST Reservoir Saturation Tool" Oilfield Review, Jan. 1994, pp. 29-39.

(Continued)

*Primary Examiner* — David Porta
*Assistant Examiner* — Djura Malevic
(74) *Attorney, Agent, or Firm* — Bracewell LLP; Constance G. Rhebergen; Vivek P. Shankam

(57) ABSTRACT

Provided are embodiments of systems, computer medium and computer-implemented methods for logging using a customizable logging tool. In some embodiments, the logging tool is capable of being disposed in a borehole formed in a geologic formation. The logging tool includes a source for emitting signals into the geologic formation surrounding the borehole and a plurality of detectors for detecting signals generated as a result of emission of signals by the source into the geologic formation surrounding the borehole. The plurality of detectors are independently repositionable such that a source-to-detector spacing for the detectors is independently variable, to provide optimum signal depending on the characteristics of the target reservoir, the borehole, and the tool source and detectors.

20 Claims, 10 Drawing Sheets

(56) References Cited

U.S. PATENT DOCUMENTS

| | | | |
|---|---|---|---|
| 4,071,757 A | 1/1978 | Arnold | |
| 4,587,424 A | 5/1986 | Grau | |
| 5,045,692 A | 9/1991 | Arnold | |
| 5,094,808 A | 3/1992 | Meeh | |
| 5,237,594 A | 8/1993 | Carroll | |
| 5,406,078 A | 4/1995 | Jacobson | |
| 5,656,930 A | 8/1997 | Hagiwara | |
| 5,900,733 A | 5/1999 | Wu et al. | |
| 6,936,812 B2 | 8/2005 | Odom et al. | |
| 7,059,404 B2 | 6/2006 | Flecker et al. | |
| 7,925,443 B2 | 4/2011 | Wahrmund et al. | |
| 8,800,653 B2 | 8/2014 | Dria | |
| 8,964,504 B2 | 2/2015 | Chace | |
| 8,975,574 B2 * | 3/2015 | Huiszoon | G01V 5/08 250/265 |
| 2006/0102834 A1 * | 5/2006 | Mickael | G01V 5/08 250/269.1 |
| 2007/0150201 A1 | 6/2007 | Eidesmo et al. | |
| 2011/0238313 A1 * | 9/2011 | Thornton | G01V 5/107 702/8 |
| 2013/0105678 A1 * | 5/2013 | Wilson | G01V 5/101 250/254 |
| 2013/0119245 A1 | 5/2013 | Difoggio | |
| 2013/0299687 A1 | 11/2013 | Scott et al. | |
| 2015/0090871 A1 | 4/2015 | Chace | |
| 2016/0047238 A1 | 2/2016 | Zeroug et al. | |

OTHER PUBLICATIONS

Badruzzaman et al. "Multi-Sensor Through-Casing Density and Saturation Measurement Concepts With a Pulsed Neutron Source: A Modeling Assessment" SPE 89884, SPE International Petroleum Conference, Nov. 7-9, 2004, Puebla Pue., Mexico, pp. 1-14.

Eyvazzadeh et al. "An Innovative Application to Reduce Petrophysical Uncertainty in Reservoir Monitoring: Case Studies from Giant Saudi Arabian Fields" SPE 97519, SPE International Improved Oil Recovery Conference, Dec. 5-6, 2005, Kuala Lumpur, Malaysia, pp. 1-8.

Gilchrist, Jr. et al. "Introduction of a New Through-Tubing Multifunction Pulsed Neutron Instrument" paper SPE 56803, Society of Petroleum Engineers, SPE Annual Technical Conference and Exhibition, Oct. 3-6, 1999, Houston, Texas, pp. 1-11.

Jacobson et al. "A New Small-Diameter, High-Performance Reservoir Monitoring Tool" SPWLA paper K, Society of Petrophysicists and Well-Log Analysts, SPWLA 39th Annual Logging Symposium, May 26-29, 1998, Keystone, Colorado, pp. 1-14.

Jacobson et al. "Carbon/Oxygen Tool Response in Open Hole" SPWLA paper RR, Society of Petrophysicists and Well-Log Analysts, SPWLA 46th Annual Logging Symposium, Jun. 26-29, 2005, New Orleans, Louisiana, pp. 1-11.

Wu et al. "Monte Carlo Simulating of Three Detector Density Logging" Chinese Journal of Geophysics, vol. 47, No. 1, 2004, pp. 181-187.

Zett et al. "Surveillance of Complex Displacement Mechanisms in Mature Reservoirs to Maximize Recovery" paper SPE 159185, Society of Petroleum Engineers, SPE Annual Technical Conference and Exhibition, Oct. 8-10, 2012, San Antonio, Texas, pp. 1-9.

International Search Report and Written Opinion for PCT/US2015/035123 (SA5275PCT) dated Jan. 28, 2016.

* cited by examiner

SYSTEMS, COMPUTER MEDIUM AND COMPUTER-IMPLEMENTED METHODS FOR LOGGING USING A LOGGING TOOL WITH ADJUSTABLE DETECTORS

FIELD OF INVENTION

The present invention relates generally to well logging and more particularly to systems, machines, non-transitory computer medium having computer program instructions stored thereon, and computer-implemented methods for reservoir logging.

BACKGROUND OF THE INVENTION

Well drilling is the process of drilling a borehole in the earth to facilitate the extraction of a natural resource such as ground water, brine, natural gas or petroleum, for the injection of a fluid from surface to a subsurface reservoir, or for subsurface formations evaluation or monitoring. These drilling processes are sometimes referred to as borehole drilling, and the resulting borehole is often referred to as a well. Wells can be drilled to extract (produce) hydrocarbons, such as oil and gas, from the earth. The term 'oil well' is often used to describe a well designed to find and produce petroleum oil hydrocarbons. In the case of an oil well, some natural gas is typically produced along with oil. Due to these types of wells commonly producing one or both of oil and natural gas, they are often referred to as 'oil wells' or 'oil and gas wells.' The term 'gas well' is often reserved to describe a well designed to find and produce primarily natural gas.

Creating an oil and gas well typically involves several stages, including drilling, completion and production stages. The drilling stage typically involves drilling a hole (a borehole or wellbore) into the ground using a drill bit. The ground includes a geographic formation (reservoir) expected to contain a concentration of oil and gas that can be extracted (produced). As the well is drilled deeper sections of steel pipe (casing) are often used to line the inside diameter of the borehole to provide structural integrity. In some instances concrete is placed between the outside of the casing and the borehole to improve the structural integrity of the borehole. The drilling process is typically facilitated by a drilling rig which sits at the surface and provides for operating the drill bit, hoisting, lowering and turning drill pipe, circulating drilling fluids, and generally controlling down-hole operations.

The completion stage involves making the well ready to produce oil, gas and other hydrocarbons. In a cased-hole completion, small holes (perforations) are typically made in the portion of the casing that is located in the production zone of the well. The perforations provide a path for oil, gas and other hydrocarbons to flow from the reservoir into a production tubing that routes them to the surface. In an open-hole completion (e.g., a well having production zone that does not have casing), sand or gravel can be installed into the uncased section to maintain integrity of the borehole, while allowing oil, gas and other hydrocarbons to flow from the reservoir into the borehole. In some instances, the completion stage includes pumping fluids into the well to fracture, clean or otherwise prepare the reservoir to produce oil, gas and other hydrocarbons.

The production stage involves producing (e.g., extracting and capturing) oil, gas and other hydrocarbons from the reservoir via the well. During production, the drilling rig is typically removed and replaced with a collection of valves, referred to as a 'Christmas tree' or 'production tree', that regulates pressures, control flows, and allows access to the borehole in case further completion work is needed. A pump jack or other mechanism can be provided to assist in extracting the hydrocarbons, especially in instances where the pressure in the well is low and the hydrocarbons do not flow freely to the surface. The flow from the outlet valve of the production tree can be connected to a distribution network, including pipelines, tanks and transport vehicles to supply the production to refineries, export terminals, and so forth.

Various types of testing and measurements, including logging, can be conducted throughout the various stages of drilling a well. Well logging, also known as borehole logging, is the practice of making a detailed record (a well log) of the geologic formations penetrated by a borehole. The log can be based either on visual inspection of samples brought to the surface (geological logs) or on physical measurements made by instruments (logging tools) lowered into the hole (geophysical logs). Logging can take several forms, including wireline logging, logging while drilling, coring, and mud logging. Wireline logging involves lowering a 'logging tool'—or a string of one or more instruments—on the end of a wireline into borehole and recording petrophysical properties using a variety of sensors. Coring involves obtaining an actual sample of a rock formation from the borehole. Mud loggings involves preparing logs based on rock or soil cuttings brought to the surface by mud circulated through the borehole.

Some forms of wireline logging employ sources and detectors to determine characteristics of the geographic formation, such as reservoir saturation which can be used to determine concentrations of oil and water in a reservoir. During use, a source emits a signal into the surrounding geologic formation, and a detector senses the resulting signals. Characteristics of the resulting signals can be processed to determine the various characteristics of the geographic formation. A pulsed neutron (PN) logging tool, for example, is routinely used in reservoir surveillance to log the relative concentration of carbon and oxygen (e.g., a C/O ratio), among other reservoir parameters, that can be used to derive the reservoir saturation. A relatively high C/O indicates an oil bearing formation, whereas a relatively low C/O indicates a water-bearing formation. A traditional PN tool employs a source (e.g., a neutron source), and multiple detectors (e.g., gamma ray detectors). During operation, the PN source emits signals (e.g., neutrons) into the geologic formation surrounding the borehole, and the detectors sense signals (e.g., gamma rays) generated as a result of the emitted signals. Each of the detectors is provided at a given distance (spacing) from the source to optimize the measurements of the formation. The spacing between a given detector and the source is often referred to as the 'source-to-detector spacing' for that detector. The location of the source and the detectors on traditional PN logging tools are fixed. That is, the locations of the source and the detectors—and, thus, the distance between the source and the respective detectors, or between the detectors themselves—are set at a given position for use in a given set of logging conditions.

SUMMARY OF THE INVENTION

Applicants have recognized several shortcomings of existing logging tools that can lead to sub-optimal measurements or require the use of multiple logging tools to achieve acceptable logging results. For example, a logging tool having fixed source-to-detector spacings for use in logging a first borehole/formation with a first set of characteristics may not be suitable for using in logging a second borehole/formation with a second set of characteristics—resulting in sub-optimal logging measurements for at least the second set of characteristics. In an attempt to overcome these issues, some operators use different tools (e.g., tools having different source-to-detector spacings) for different logging conditions. For example, an operator may use a first logging tool (a two detector tool) to log a first borehole (across an oil reservoir), and use a second-different logging tool (a three detector tool) to log a second borehole (across a gas reservoir). Accordingly, an operator may be left with the options of (1) using a single logging tool across a range of conditions, despite the fact that the source-to-detector spacing is not suitable across the entire range of conditions, or (2) incurring the cost and complexity of maintaining and using different logging tools in for each set of conditions. Thus, existing logging tools fail to provide a level of flexibility that allows the tool to provide optimum measurements in broad range of borehole logging conditions. Applicants have recognized that such shortcomings have failed to be addressed by others, and have recognized that such shortcomings may be addressed by a logging tool system having detectors and/or sources that can be readily repositioned to provide variable/customizable source-to-detector spacings for some or all of the detector-source pairs. Such a customizable logging tool system may enable a single logging tool to provide optimal logging measurements in a variety of logging conditions. In view of the foregoing, various embodiments of the present invention advantageously provide systems, machines, non-transitory computer medium having computer program instructions stored thereon, and computer-implemented methods for reservoir logging using a customizable logging tool having adjustable source-to-detector spacings.

In some embodiments, provided is a borehole pulsed neutron (PN) logging system that includes a pulsed neutron (PN) logging tool to be disposed in a borehole formed in a geologic reservoir. The PN logging tool including a tool body, a pulsed neutron (PN) source for emitting neutrons into the geologic reservoir surrounding the borehole (a position of the PN source being fixed relative to the tool body), a plurality of gamma ray detectors for detecting gamma rays generated as a result of emission of neutrons by the PN source into the geologic reservoir surrounding the borehole. The plurality of independently positionable gamma ray detectors including a near gamma ray detector (to be positioned at a first longitudinal distance from the neutron source), a middle gamma ray detector (to be positioned at a second longitudinal distance from the neutron source that is greater than the first longitudinal distance) and a far gamma ray detector (to be positioned at a third longitudinal distance from the neutron source that is greater than the second longitudinal distance). Positioning of each of the near, middle and far gamma ray detectors is independently adjustable relative to the tool body such that spacing between the neutron source and each of the near, middle and far gamma ray detectors is variable independent of spacing between the neutron source and others of the near, middle and far gamma ray detectors. The system also includes a pulsed neutron (PN) logging control system for determining the first, second and third longitudinal distances (based at least in part on one or more characteristics of the geologic reservoir surrounding the borehole, one or more characteristics of the borehole, one or more characteristics of the neutron source, one or more characteristics of the gamma ray detectors, and one or more characteristics of the geologic reservoir to be determined), generating a customized reservoir model corresponding to the PN logging tool having the near gamma ray detector positioned at the first longitudinal distance, the middle gamma ray detector positioned at the second longitudinal distance, and the far gamma ray detector positioned at the third longitudinal distance, acquiring logging data utilizing the PN logging tool with the near gamma ray detector positioned at the first longitudinal distance, the middle gamma ray detector positioned at the second longitudinal distance, and the far gamma ray detector positioned at the third longitudinal distance, and processing the acquired logging data utilizing the customized reservoir model to determine one or more characteristics of the geologic reservoir surrounding the borehole.

In certain embodiments, provided is a logging tool capable of being disposed in a borehole formed in a geologic formation. The logging tool includes a source for emitting signals into the geologic formation surrounding the borehole and a plurality of detectors for detecting signals generated as a result of emission of signals by the source into the geologic formation surrounding the borehole. The plurality of detectors are independently repositionable such that a source-to-detector spacing for the detectors is independently variable.

In some embodiments, the source includes a pulsed neutron (PN) source for emitting neutrons into the geologic formation surrounding the borehole, and the plurality of detectors include a plurality of gamma ray detectors for detecting gamma rays generated as a result of emission of neutrons by the PN source into the geologic formation surrounding the borehole.

In certain embodiments, the plurality of detectors includes a near detector for positioning at a first spacing from the neutron source, a middle detector for positioning at a second spacing from the neutron source (the second spacing being greater than the first spacing), and a far detector for positioning at a third spacing from the neutron source (the third spacing being greater than the second spacing).

In some embodiments, the tool includes a tool body, the logging tool is capable of being disposed in the borehole such that the longitudinal axis of the tool body is substantially aligned with a longitudinal axis of the borehole, and positioning of the detectors is independently adjustable relative to the tool body in a longitudinal direction substantially parallel to the longitudinal axis of the tool body such that source-to-detector spacing for each of the detectors is variable in the longitudinal direction.

In certain embodiments, a position of the source is fixed relative to the tool body. In some embodiments, a position of the source is adjustable relative to the tool body. In certain embodiments, the logging tool includes one or more slots extending in a longitudinal direction substantially parallel to the longitudinal axis of the tool body, and at least one of the plurality of detectors is repositionable in the longitudinal direction via sliding the detector along the slot.

In some embodiments, the logging tool includes one or more repositioning devices configured to automatically reposition one or more of the detectors without manual intervention by a user. In some embodiments, the positions of the detectors are capable of being fixed prior to disposing the logging tool into the borehole. In certain embodiments, the positions of the detectors are dynamically repositionable while the logging tool is disposed in the borehole.

In certain embodiments, the source comprises neutron source, a gamma ray source, a sonic transmitter or a resistivity/conductivity transmitter.

In some embodiments, provided is a method for downhole logging utilizing a logging tool to be disposed in a borehole formed in a geologic formation. The logging tool including a source for emitting signals into the geologic formation surrounding the borehole and a plurality of detectors for detecting signals generated as a result of emission of signals by the source into the geologic formation surrounding the borehole. Positioning of the detectors is independently adjustable such that a source-to-detector spacing for the detectors is independently variable. The method including identifying a source-to-detector spacing for each of the plurality of detectors of the logging tool, positioning each of the plurality of detectors of the logging tool at the respective source-to-detector spacings identified, and disposing the logging tool into the borehole to acquire logging data utilizing the logging tool with the plurality of detectors positioned at the respective source-to-detector spacings determined.

In certain embodiments, positioning each of the plurality of detectors of the logging tool at the respective source-to-detector spacings identified includes physically repositioning one or more of the plurality of detectors relative to the source of the logging tool.

In some embodiments, positioning each of the plurality of detectors of the logging tool at the respective source-to-detector spacings identified includes independently moving two or more of the plurality of detectors independent from one another to the respective source-to-detector spacings.

In certain embodiments, positioning each of the plurality of detectors of the logging tool at the respective source-to-detector spacings identified includes physically moving a first of the plurality of detectors a first distance relative to the source of the logging tool and physically moving a second of the plurality of detectors a second distance relative to the source of the logging tool (the first distance being different from the second distance).

In some embodiments, provided is a method for downhole logging utilizing a logging tool capable of being disposed in a borehole formed in a geologic formation. The logging tool includes a source for emitting signals into the geologic formation surrounding the borehole, and a plurality of detectors for detecting signals generated as a result of emission of signals by the source into the geologic formation surrounding the borehole. Positioning of the detectors is independently adjustable such that source-to-detector spacing for each of the detectors is independently variable. The method includes determining a source-to-detector spacing for each of the plurality of detectors of the logging tool, identifying a geologic formation model corresponding to the logging tool having the plurality of detectors positioned at the respective source-to-detector spacings determined, acquiring logging data utilizing the logging tool with the plurality of detectors positioned at the respective source-to-detector spacings determined, and processing the acquired logging data utilizing the customized geologic formation model to determine one or more characteristics of the geologic formation.

In certain embodiments, determining a source-to-detector spacing for each of the plurality of detectors of the logging tool includes determining a source-to-detector spacing for each of the plurality of detectors of the logging tool based at least in part on at least one of the following: one or more characteristics of the geologic reservoir surrounding the borehole, one or more characteristics of the borehole, one or more characteristics of the neutron source, one or more characteristics of the gamma ray detectors, and one or more characteristics of the geologic reservoir to be determined.

In some embodiments, provided is a computer-implemented method for borehole logging. The method including identifying, by one or more processors, a set of logging conditions corresponding to logging of a borehole in a formation, identifying, by the one or more processors, a source-to-detector spacing for each of the plurality of detectors of the logging tool (the source-to-detectors spacing being identified based at least in part on the set of logging conditions corresponding to logging of a borehole), providing, by the one or more processors, for positioning each of the plurality of detectors of the logging tool at the respective source-to-detector spacings identified, identifying, by the one or more processors, a logging model corresponding to the logging conditions and the logging tool having the plurality of detectors positioned at the respective source-to-detector spacings identified, receiving, by the one or more processors, logging data for the borehole from the logging tool having the plurality of detectors positioned at the respective source-to-detector spacings identified, and processing, by the one or more processors, the logging data using the logging model to identify one or more characteristics of the formation.

In certain embodiments, provided is a non-transitory computer readable storage medium having program instructions stored thereon that are executable by one or more processors to cause steps for down-hole logging utilizing a logging tool capable of being disposed in a borehole formed in a geologic formation. The logging tool including a source for emitting signals into the geologic formation surrounding the borehole and a plurality of detectors for detecting signals generated as a result of emission of signals by the source into the geologic formation surrounding the borehole. Positioning of the detectors is independently adjustable such that source-to-detector spacing for each of the detectors is independently variable. The steps including determining a source-to-detector spacing for each of the plurality of detectors of the logging tool, identifying a geologic formation model corresponding to the logging tool having the plurality of detectors positioned at the respective source-to-detector spacing determined, acquiring logging data utilizing the logging tool with the plurality of detectors positioned at the respective source-to-detector spacing determined, and processing the acquired logging data utilizing the customized geologic formation model to determine one or more characteristics of the geologic formation.

In some embodiments, provided is a non-transitory computer readable storage medium having program instructions stored thereon that are executable by one or more processors to cause the following steps for borehole logging: identifying a set of logging conditions corresponding to logging of a borehole in a formation, identifying a source-to-detector spacing for each of the plurality of detectors of the logging tool (the source-to-detectors spacing being identified based at least in part on the set of logging conditions corresponding to logging of a borehole), providing for positioning each of the plurality of detectors of the logging tool at the respective source-to-detector spacings identified, identifying a logging model corresponding to the logging conditions and the logging tool having the plurality of detectors positioned at the respective source-to-detector spacings identified, receiving logging data for the borehole from the logging tool having the plurality of detectors positioned at the respective source-to-detector spacings identified, and processing the logging data using the logging model to identify one or more characteristics of the formation.

Accordingly, as described herein, embodiments of the system, computer program instructions and associated computer-implemented methods provide for reservoir logging using a customizable logging tool having adjustable source-to-detector spacing(s).

Figure 1:
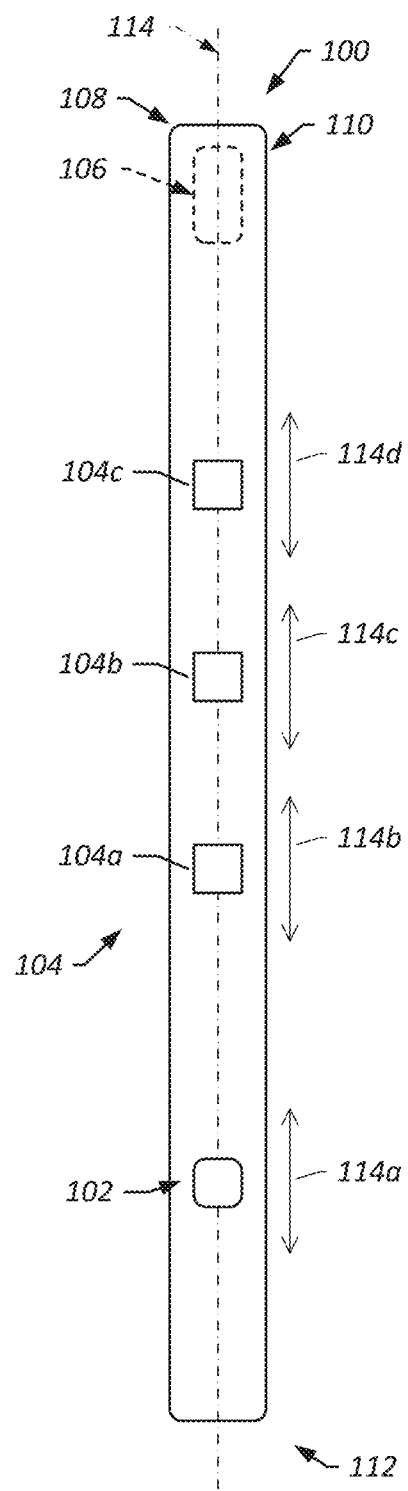
FIG. 1 illustrates a customizable logging tool in accordance with one or more embodiments of the present invention.

While the invention is susceptible to various modifications and alternative forms, specific embodiments of the invention are shown by way of example in the drawings and will be described in detail herein. It should be understood, however, that the drawings and detailed description thereof are not intended to limit the invention to the particular form disclosed, but to the contrary, are intended to cover all modifications, equivalents, and alternatives falling within the spirit and scope of the present invention as defined by the appended claims.

DETAILED DESCRIPTION

The present invention will now be described more fully hereinafter with reference to the accompanying drawings in which exemplary embodiments of the invention are shown. This invention may, however, be embodied in many different forms and should not be construed as limited to the illustrated embodiments set forth herein, rather, these exemplary embodiments are provided so that this disclosure will be thorough and complete, and will fully convey the scope of the invention to those skilled in the art.

In some embodiments, provided is a customizable logging tool having adjustable source-to-detector spacings. In some embodiments, such adjustability enables the logging tool to be customized for use in a variety of different logging conditions. For example, the logging tool may be configured with its source and detectors positioned in a first configuration that provides optimal source-to-detector spacings for logging a borehole under a first set of logging conditions, and may be re-configured (e.g., by moving one or more of the source and the detectors) such that its source and detectors are positioned in a second configuration that provides optimal source-to-detector spacings for logging a second borehole under a second set of logging conditions. Thus, in some embodiments, the same customizable logging tool can be used for logging in a variety of logging conditions.

In some embodiments each of the detectors is independently repositionable such that a source-to-detectors spacing for a given source/detector pair can be changed independent of changes to source-to-detector spacings other source/detector pairs. For example, a first detector can be moved 50 mm away from the source and the second detector can be moved 25 mm toward the source to provide a custom logging tool configuration. In some embodiments, the logging tool includes a pulsed neutron (PN) logging tool having a PN source and one or more gamma ray detectors.

In some embodiments, a down-hole logging using a customizable logging tool generally includes identifying an optimal source-to-detector spacing (e.g., based on current logging conditions), configuring the customizable logging tool based on the source-to-detector spacing (e.g., moving the source and/or the detectors into positions that correspond to the optimal source-to-detector spacing), identifying a logging model corresponding to the configured logging tool (e.g., a model corresponding the logging conditions and/or the source-to-detector spacing of the configured tool), acquiring logging data using the configured logging tool, and processing the acquired logging data using the logging model. Such embodiments may enable the same logging tool to be used for logging in a variety of conditions.

Although certain embodiments are described with regard to pulsed neutron (PN) logging and PN logging tools for the purpose of illustration, the techniques described herein can be applied to any variety of logging techniques. For example, the described techniques may be employed for use with PN sources paired with gamma ray detectors, neutron sources paired with neutron detectors, gamma ray sources paired with gamma ray detectors, sonic transmitter paired with sonic receivers, resistivity/conductivity transmitters paired with resistivity/conductivity receivers, and/or the like. Moreover, although certain embodiments are described with regard to oil and gas well logging applications, the techniques described herein can be applied to any variety of logging applications.

FIG. 1 illustrates a customizable borehole logging tool (logging tool) 100 in accordance with one or more embodiments of the present invention. In the illustrated embodiment, logging tool 100 includes a source 102, detectors 104, logging tool electronics 106, and a tool body 108. As depicted tool body 108 may have a first (upper) end 110, a second (lower) end 112, and a longitudinal axis (tool axis) 114 extending along its length (e.g., through first and second ends 110 and 112).

Source 102 may include a device capable of emitting signals into a geologic formation. The emitted signals may be used to assess characteristics of the formation. For example, in the case of pulsed neutron (PN) logging, source 102 may include a neutron source that is activated to emit neutrons into the formation surrounding the borehole. During a PN logging operation, logging tool 100 may be lowered into a borehole in a formation, source 102 may be activated to emit neutrons into the formation surrounding the borehole, and characteristics of the formation may be determined based at least in part on the formation's absorption of the neutrons.

A detector 104 may include one or more devices capable of detecting/sensing signals reflected from a geologic formation (or otherwise present) as a result of signals emitted by source 102. For example, in the case of PN logging detector 104 may include a gamma ray detector that senses gamma rays reflected from the formation (or otherwise present) as a result of neutrons emitted by source 102 into the formation surrounding the borehole. During a PN logging operation, logging tool 100 may be lowered into a borehole in a formation, source 102 may be activated to emit neutrons into the formation surrounding the borehole, one or more detectors 104 may be activated to sense gamma rays reflected from the formation (or otherwise present) as a result of neutrons emitted by source 102, and characteristics of the formation may be determined based at least in part on the sensed gamma rays which are indicative of the formation's absorption of the neutrons.

Logging tool 100 may include any number of detectors suitable for acquiring logging data. For example, in the illustrated embodiment, logging tool 100 includes three detectors—a near detector 104a, a middle detector 104b, and a far detector 104c. 'Near detector' may refer to a detector nearest the source, 'far detector' may refer to a detector farthest from the source, and, if more than two detectors are present, 'middle detector(s)' may refer to one or more detectors located between the 'near' and 'far' detectors. If more than three detectors are present, the middle detectors may be referred to in varying degrees. For example, four detectors may be referred to a 'near', 'mid-near', 'mid-far' and 'far' detectors, in order of increasing distance from the source.

Logging tool electronics 106 may include circuitry and/or processing devices that facilitate control of various operational aspects of logging tool 100. For example, logging tool electronics 106 may control activation of source 102 (e.g., to cause emission of signals into a surrounding formation) and/or activation of detectors 104 (e.g., to cause sensing/measuring of signals resulting from the signals emitted into the surrounding formation). As described herein, in some embodiments, logging tool electronics 106 facilitate communication with other devices of a logging system. For example, during a logging operation logging tool electronics 106 may receive a command (e.g., a command from a surface based control system) to conduct a logging sequence. In response to the command, logging tool electronics 106 may conduct a logging sequence that includes, for example, activating source 102 (e.g., causing source 102 to emit signals into the surrounding formation), monitoring signals received from detectors 104a, 104b and 104c (e.g., signals that are indicative of the signals sensed by detectors 104a, 104b and 104c), and generating corresponding logging data (e.g., transmitting logging data that is indicative of the signals sensed by detectors 104a, 104b and 104c to the surface based control system).

In some embodiments, a logging sequence includes returning the logging data to the surface in real-time. For example, logging tool electronics may stream logging data to a surface system (e.g., a logging control system) within a fraction of a second, seconds or minutes of the detectors sensing the corresponding signals. Such streaming of logging data may provide the surface system and operators with instantaneous feedback that can be used to make real-time assessments of the logging while the logging tool is down-hole, including, for example, determining the current logging conditions and the characteristics of the formation surrounding the logging tool based at least in part on the logging data. It may also allow an operator to make decisions regarding ongoing logging or other operational aspects with the logging tool down-hole based at least in part on the logging data.

In some embodiment, logging tool electronics 106 include an onboard memory that enables the storage of logging data. For example, logging tool electronics 106 may process the raw signals received from detectors 104a, 104b and 104c to generate logging data corresponding thereto, and store the logging data in the onboard memory (e.g., memory 1002 described with regard to at least FIG. 10). The stored logging data may be retrieved from the onboard memory when the logging tool is returned to the surface. Such storage of logging data may be of particular useful if down-hole communication with logging tool 100 is not available (e.g., streaming of logging data is not possible).

Tool body 108 may provide for positioning of source 102 and detectors 104 relative to one another. In some embodiments, tool body may include a rigid structure, such as a metal cylinder. Such a rigid structure may enable source 102 and detectors 104 to be affixed thereto, thereby establishing source-to-detectors spacing that do not inadvertently vary during a logging sequence. In some embodiments, logging tool electronics 106, source 102 and/or detectors 104 are housed/encapsulated by tool body 108. In such an embodiment, tool body 108 may protect logging tool electronics 106, source 102 and/or detectors 104 from damage during use (e.g., when logging tool 100 is lowered into a borehole during a logging operation).

In some embodiments, the positions of source 102 and/or one or more of detectors 104 is independently adjustable/variable. For example, the position of source 102, detector 104a, detector 104b and/or detector 104c may be adjustable/variable in a longitudinal direction (e.g., in the direction of tool axis 114) as illustrated by arrows 114a, 114b, 114c and 114d, respectively. That is, for example, in one instance when changing from a first to a second tool configuration, near detector 104a may not be moved relative to source 102, middle detector 104b may be moved a first distance (e.g., 50 mm) away from source 102, and far detector 104c may be moved a second distance (e.g., 75 mm) away from source 102. Accordingly, detectors 104 do not have to be moved in unison relative to source 102. Such adjustability may enable independent variations of the source-to-detector spacings for some or all of the source-detectors pairs of logging tool 100. For example, near detector 104a may be moved away from or toward source 102 to increase or decrease the source-to-detector spacing for the first/near source-detector pair (e.g., source 102 and detector 104a), middle detector 104b may be moved away from or toward source 102 to increase or decrease the source-to-detector spacing for the second/middle source-detector pair (e.g., source 102 and detector 104b), and far detector 104c may be moved away from or toward source 102 to increase or decrease the source-to-detector spacing for the third/far source-detector pair (e.g., source 102 and detector 104c). In some embodiments, source 102 may be moved away from or toward detectors 104 to increase or decrease the source-to-detector spacing for the near, middle and far source-detector pairs. Source 102 may be moved in conjunction with or independent of movement of detectors 104a, 104b and/or 104c. For example, source 102 may be moved away (e.g., downward in the illustrated embodiment) to simultaneously increase the source-to-detector spacing for all three of the near, middle and far source-detector pairs.

In some embodiments, source 102 and/or detectors 104 of logging tool 100 are positioned to provide an optimal source-to-detector spacing for each source/detector pair under a given set of logging conditions. For example, if logging tool 100 includes an adjustable source 102 and/or one or more adjustable detectors 104 and it is being prepared for logging a formation under a given set of logging conditions (e.g., the logging conditions including characteristics of the borehole, characteristics of the formation, etc.), source 102 and/or detectors 104 may be positioned such that each source-detector pair's spacing corresponds to an optimal source-to-detector spacing determined for that source-detector pair under the given set of logging conditions. Further, if the same logging tool 100 is being prepared for logging under a second set of logging conditions (e.g., for logging a second borehole in a second formation having a different set of logging conditions that are different from those of the borehole and the formation previously logged using logging tool 100), some or all of source 102 and/or detectors 104 may be repositioned such that each source/detector pair's source-to-detector spacing corresponds to an optimal source-to-detector spacing determined for that source-detector pair under the given set of logging conditions. Such tool customization (e.g., repositioning of source 102 and/or detectors 104 to match or otherwise correspond to the optimal source-to-detectors spacings) can be repeated for any variety of logging conditions such that a single customizable logging tool can be used to provide optimal logging data in a wide variety of logging conditions.

In some embodiments, adjustable source 102 and/or adjustable detectors 104 are positioned manually. For example, an operator may manually reposition source 102 and/or detectors 104 such that each source-detector pair's spacing corresponds to the optimal source-to-detector spacing determined for that source-detector pair and the given logging conditions. Such manual repositioning of source 102 and/or detectors 104 may be physically performed by a person and/or device at the surface, prior to logging tool 100 being lowered into the borehole. In some embodiments, adjustable source 102 and/or adjustable detectors 104 are positioned automatically. For example, logging tool 100 may include one or more positioning devices (e.g., actuators) that can reposition source 102 and/or detectors 104 such that each source-detector pair's spacing corresponds to the optimal source-to-detector spacing determined for that source-detector pair under the given logging conditions. Such automated repositioning of source 102 and/or detectors 104 may be performed at the surface (e.g., prior to logging tool 100 being lowered into the borehole) and/or while logging tool 100 is down-hole (e.g., disposed in the borehole).

Figure 2:
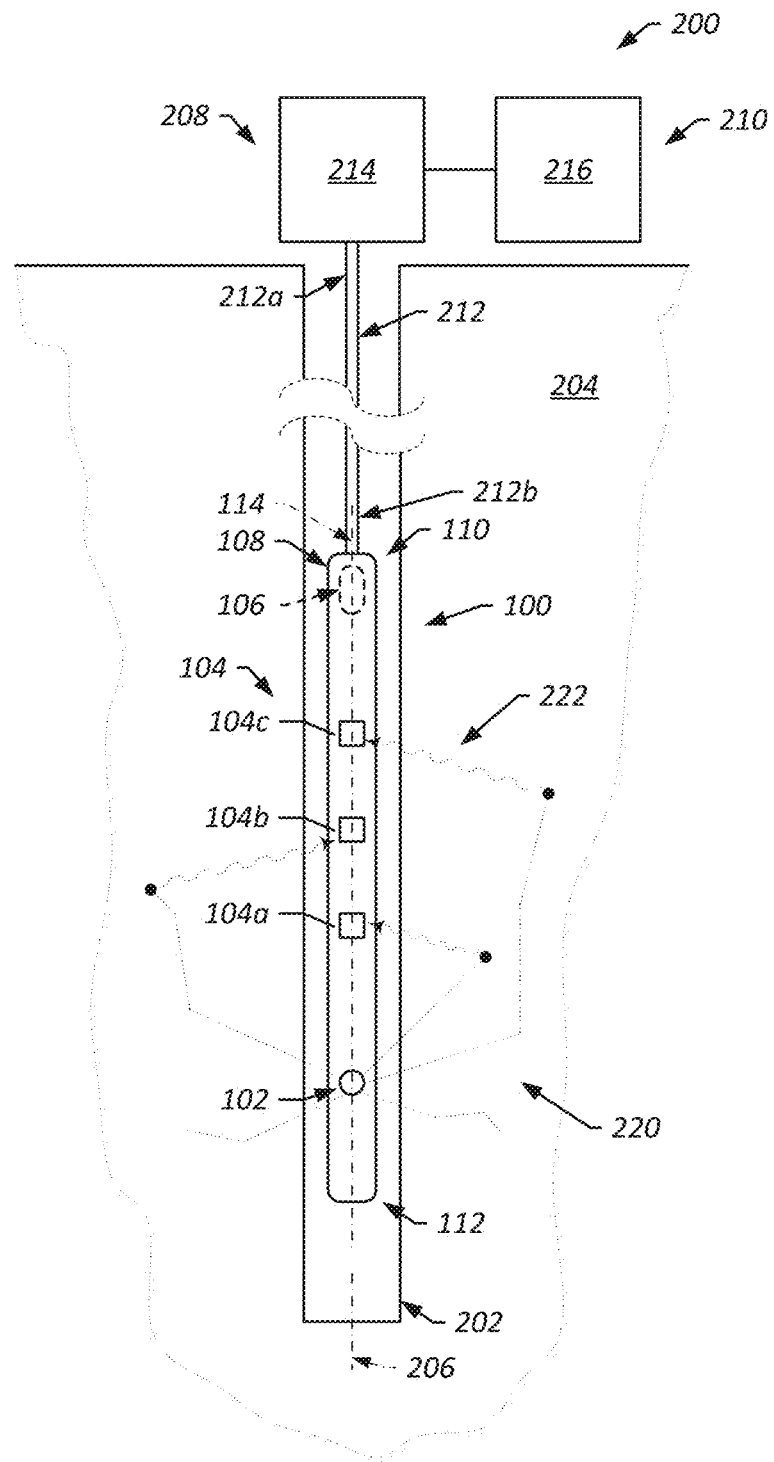
FIG. 2 illustrates a logging tool system employing a customizable logging tool in accordance with one or more embodiments of the present invention.

FIG. 2 illustrates a borehole logging system 200 employing customizable logging tool 100 in accordance with one or more embodiments of the present invention. Borehole logging system 200 includes logging tool 100, a borehole ('wellbore') 202 formed in a geologic formation ('reservoir') 204 and having a longitudinal axis ('borehole axis') 206, a conveyance system 208, a control system 210. As depicted in the illustrated embodiment, logging tool 100 may be disposed into borehole 200 with its lower end 112 entering borehole 200 first, followed by its upper end 110. When inserted into the borehole, tool axis 114 may be generally aligned with borehole axis 204.

Borehole 202 may include any form of a hole formed in a geologic formation. In some embodiments, borehole 202 may include a well-bore created for the purpose of locating and extracting hydrocarbons or other resources from reservoir 204. For example, reservoir 204 may include an oil and gas reservoir, and borehole 202 may include a well-bore drilled into reservoir 204 for the purpose of locating and extracting oil, gas and other hydrocarbons therefrom.

Although the illustrated portion of borehole 202 includes a substantially straight, vertical column, borehole 202 may take any variety of suitable shapes/directions. In some embodiments, borehole 202 may deviate from vertical along its length as a result lateral deviation of the drill bit during the drilling process (e.g., the drill bit inadvertently drifting—or sometimes being intentionally forced to drift—to left or right during the drilling process). As a further example, borehole 202 may include a directional borehole formed using directional drilling techniques. For example, in the case of a horizontal well, borehole 202 may include a first vertical borehole section that extends downward from the surface into the formation, and a second horizontal borehole section that extends outward into the formation. Such directional horizontal drilling techniques are sometimes employed in an effort to penetrate multiple zones of interest. For example, in the case of oil wells, vertical borehole sections may be created to intersect one more production zones that extend horizontally in the formation and/or a horizontal borehole sections may be created to intersect one or more production zones that extend vertically in the formation. When inserted (e.g., lowered) into a borehole with varying direction, a logging tool may generally follow the direction of the borehole such that its axis remains substantially aligned with the axis of the boreholes. For example, in the case of borehole 202 having a vertical borehole section, and a horizontal borehole section, logging tool 100 may travel through the vertical borehole section in a substantially vertical orientation, and rotate into a substantially horizontal orientation as it travels into and through the horizontal borehole section.

Conveyance system 208 may provide for conveying (transporting) tools and equipment to and/or from a subsurface location. In some embodiments, conveyance system 208 may be used to transport drilling bits, logging tools, perforating guns, fracturing fluids, and/or the like to and/or from a subsurface portion of borehole 202. For example, conveyance system 208 may include devices for lowering logging tool 100 into borehole 202, and subsequently retrieving (raising) logging tool 100 therefrom. The type and configuration of conveyance system 208 may vary based on the characteristics of the borehole and/or the tool or equipment being conveyed.

In some embodiments, conveyance system 208 includes a conveying member 212 that facilitates transporting logging tool 100 and/or communication (e.g., electrical and data communications) between logging tool 100 and surface systems. Conveying member 212 may include a first (upper) end 212a coupled to a surface conveyance unit 214 and a second (lower) end 212b coupled to logging tool 100. The type of conveying member 212 and/or surface conveyance unit 214 may vary based on the conveyance technique being employed. For example, if conveyance system 208 is a wireline system, conveying member 212 may include a wireline cable and surface conveyance unit 214 may include a wireline spool. As a further example, if conveyance system 208 is a drill pipe system, conveying member 212 may include drill pipe and surface conveyance unit 214 may include a drilling rig. As yet another example, if conveyance system 208 is a coiled tubing (CT) system, conveying member 212 may include coiled tubing (CT) (e.g., including a wireline disposed therein) and surface conveyance unit 214 may include a CT spool. In some embodiments, conveyance system 208 employs a tractor conveyance device. A tractor may include a down-hole device (e.g., a disposed in the borehole) and coupled to the logging tool 100 to provide physical force to push or pull logging tool 100 through the borehole. A tractor may be used in place of or in combination with one of the above described conveyance techniques. For example, conveyance system 208 may include both a wireline type conveying member 212 and a down-hole tractor that is disposed above or below logging tool 100 to provide physical force to assist in pushing and/or pulling logging tool 100 up and/or down through borehole 202.

Control system 210 may control various operational aspects of logging system 200. For example, control system 210 may include control circuitry and processing systems to provide monitoring and/or control of well drilling, completion and production operations. In some embodiments, control system 210 includes a logging control system 216 that provides for monitoring and/or controlling logging operations using logging tool 100. For example, logging control system 216 may control conveyance system 208 based on feedback provided by conveyance system 208 and/or logging tool 100. The feedback may include, for example, depth measurements returned from conveyance system 208 and/or logging data received from logging tool 100.

In some embodiments, logging control system 216 facilitates configuring of source-to-detector spacings of logging tool 100. For example, logging control system 216 may determine optimal source-to-detector spacing for source 102 and each of detectors 104 of logging tool 100 based on a given set of logging conditions. In some embodiments, the optimal source-to-detector spacings are provided to an operator for use in configuring logging tool 100. For example, if logging tool 100 includes an adjustable source 102 and/or one or more adjustable detectors 104, and it is being prepared for logging under a given set of logging conditions, an operator may receive the optimal source-to-detector spacings determined by logging control system 216 and manually reposition source 102 and/or detectors 104 such that each source-detector pair's spacing corresponds to the optimal source-to-detector spacing determined for that source-detector pair and the given set of logging conditions. As a further example, where logging tool 100 includes an adjustable source 102 and/or one or more adjustable detectors 104 that can be moved automatically (e.g., via an actuator), logging control system 216 may control automated repositioning of source 102 and/or detectors 104 such that each source-detector pair's spacing corresponds to the optimal source-to-detector spacing determined for that source-detector pair and the given set of logging conditions. For example, logging control system may issue a command to logging tool electronics that causes the repositioning devices of logging tool 100 to move source 102 and/or detectors 104 into positions corresponding to the optimal source-to-detector spacing.

In some embodiments, logging control system 216 provides for acquiring logging measurements via logging tool 100. For example, logging control system 216 may transmit a signal to logging tool electronics 106 commanding initiation and/or termination of a logging operation. Logging tool electronics 106 may, in turn, conduct a logging sequence that includes providing corresponding logging data to logging control system 216.

In some embodiments, logging control system 216 provides for processing of logging data. For example, logging control system 210 may process logging data received from logging tool 100 to generate logging results, including, for example, determining various characteristics of reservoir 204, such as such as saturation of reservoir 204 and/or concentrations of oil and/or water in a reservoir 204, and/or a log thereof. Such logging results can be used, for example, by an operator to make determinations on how to proceed with a logging operation and/or to make assessments of the reservoir's production potential.

Figure 3C:
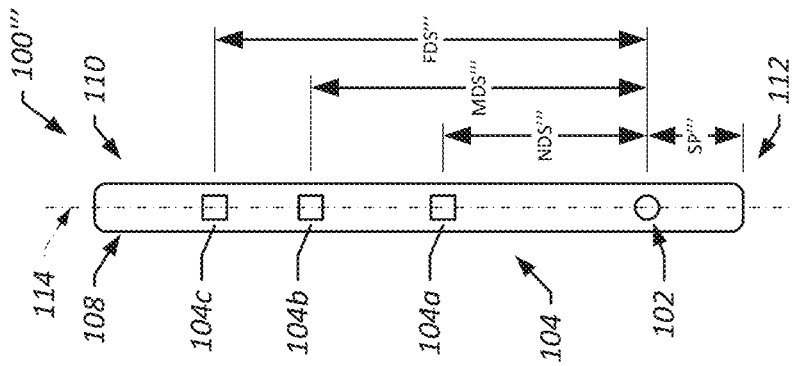
FIGS. 3A-3C illustrate various configurations of a customizable logging tool in accordance with one or more embodiments of the present invention.
Figure 3B:
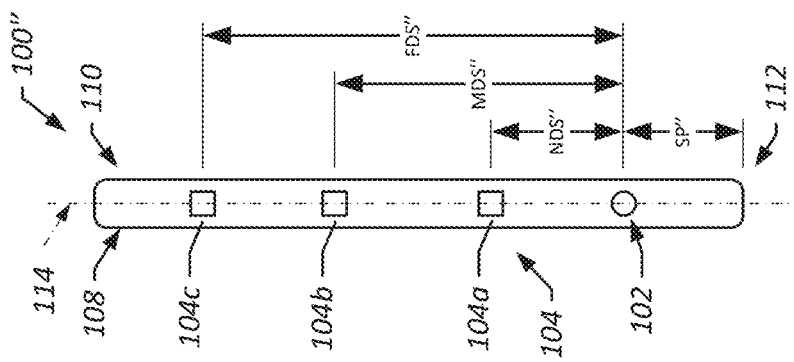
Figure 3A:
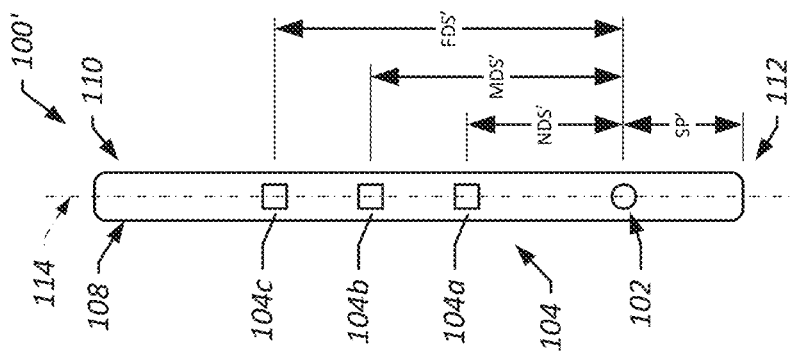

FIGS. 3A-3C illustrate various configurations of a customizable logging tool 100 in accordance with one or more embodiments of the present invention. FIGS. 3A, 3B and 3C illustrate logging tool 100 provided in a first configuration, a second configuration and a third configuration, respectively. Each of the first, second and third configurations may include a set of source-to-detectors spacings that are optimized for a given set of logging conditions. For example, logging tool 100' may be configured for use in a first borehole at a given depth, logging tool 100" may be configured for use in a second borehole at a first depth, and logging tool 100''' may be configured for use in the second borehole at a second depth. Accordingly, the same logging tool 100 may be used across a variety of logging conditions.

FIG. 3A depicts logging tool 100 having a first configuration (logging tool 100') that includes source 102 and detectors 104a, 104b and 104c disposed at first positions to provide a first set of source-to-detector spacings NDS', MDS' and FDS' for the respective first/near, second/middle, third/far source-detector pairs. The distances NDS', MDS', FDS' and SP' may be 200 mm, 350 mm, 650 mm and 100 mm respectively, based on logging tool 100' being configured for use in a first set of logging conditions. The location of source 102 is also represented by a first source position SP' (e.g., a distance measured from second/lower end 112 of tool body 108 of logging tool 100).

FIG. 3B depicts logging tool 100 having a second configuration (logging tool 100") that includes source 102 and detectors 104a, 104b and 104c disposed at second positions to provide a second set of source-to-detector spacings NDS", MDS" and FDS" for the respective first/near, second/middle, third/far source-detector pairs. The location of source 102 is also represented by a second source position SP". The distances NDS", MDS", FDS" and SP" may be, for example, 275 mm, 450 mm, 800 mm and 100 mm respectively, based on logging tool 100" being configured for use in a second set of logging conditions. Spacings can be larger, in some instances, to accommodate for gas reservoirs, where neutrons can travel further into the reservoir.

FIG. 3C depicts logging tool 100 having a third configuration (logging tool 100''') that includes source 102 and detectors 104a, 104b and 104c disposed at third positions to provide a third set of source-to-detector spacings NDS''', MDS''' and FDS''' for the respective first/near, second/middle, third/far source-detector pairs. The location of source 102 is also represented by a third source position SP'''. The distances NDS''', MDS''', FDS''' and SP''' may be, for example, 175 mm, 225 mm, 500 mm and 75 mm respectively, based on logging tool 100''' being configured for use in a third set of logging conditions. These distances can be closer to the source, in some instances, such as for heavier oil reservoirs where neutrons slowed down faster and, therefore, cannot travel further into the reservoir.

As depicted, source 102 and/or each of detectors 104 may be independently repositionable. For example, when changing from first tool configuration 100' to second tool configuration 100" (e.g., to configure the logging tool 100 for logging of the second borehole after it was used to log the first borehole), source 102 may not be moved, near detector 104*a* may be moved upward 75 mm middle detector 104*b* may be moved upward 100 mm, and far detector 104*c* may be moved upward 150 mm. As further example, when changing from second tool configuration 100" to third tool configuration 100''' (e.g., to configure the logging tool 100 for logging of the second borehole at the second depth after it was used to log the second borehole at the first depth), source 102 may be moved downward 25 mm, near detector 104*a* may be moved downward 250 mm, middle detector 104*b* may be moved downward 250 mm, and far detector 104*c* may be moved downward 325 mm.

Although the illustrated embodiments include each of source 102 and/or detectors 104 being adjustable, embodiments may include one or more of source 102 and/or detectors 104 having a fixed position (e.g., not movable relative to body 108). For example, source 102 may have a fixed positions (e.g., is not adjustable) while some or all of detectors 104 are repositionable (e.g., are adjustable).

Figure 4A:
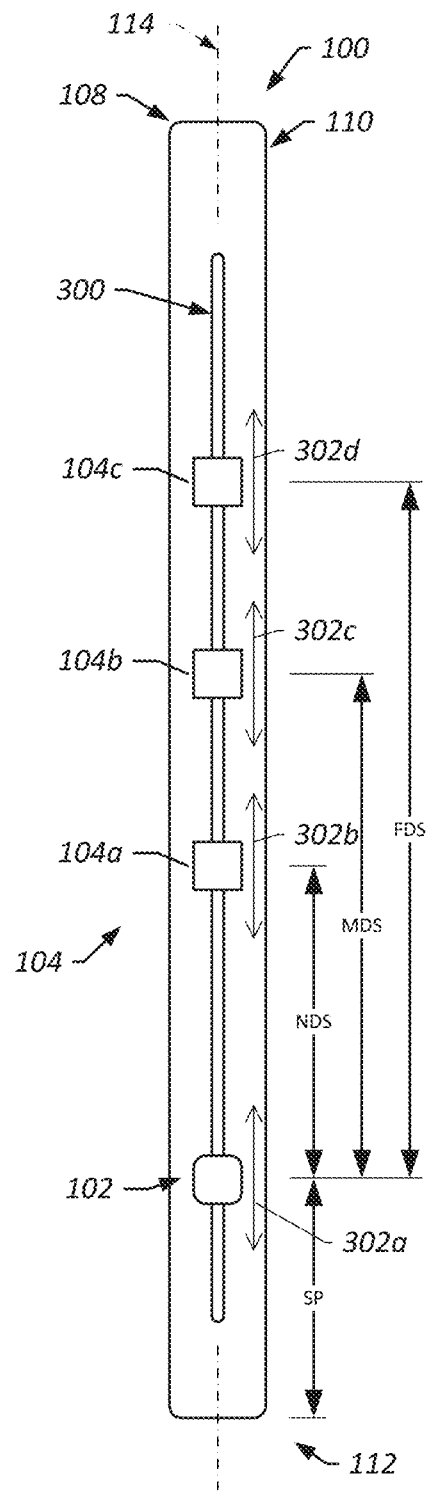
FIGS. 4A and 4B illustrate customizable logging tool employing adjustable measurement devices in accordance with one or more embodiments of the present invention.
Figure 4B:
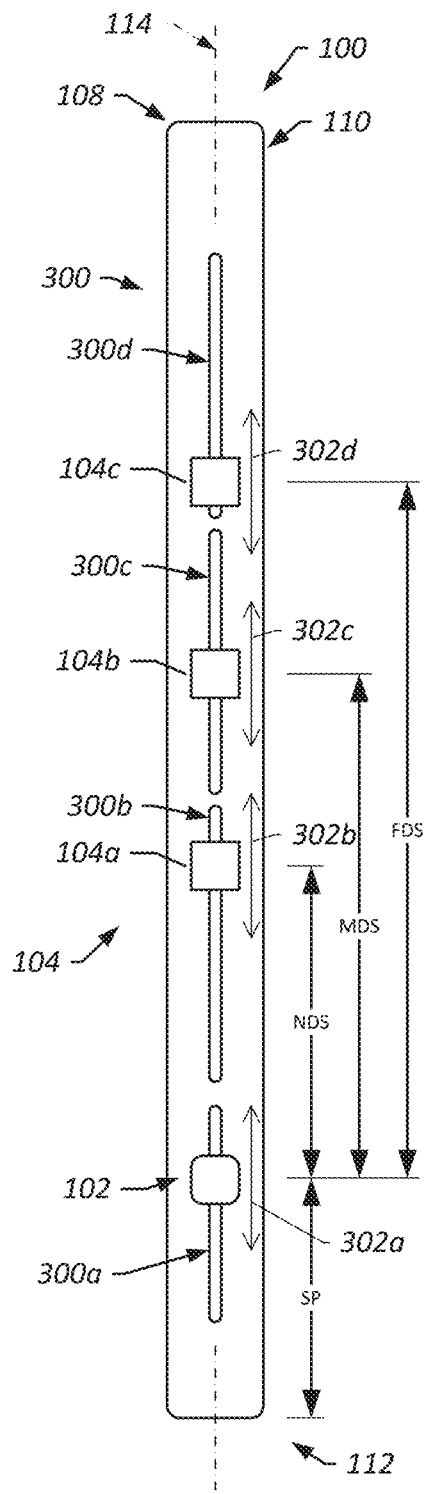

FIGS. 4A and 4B illustrate customizable logging tool 100 employing adjustable (e.g., sliding) measurement devices (e.g. source 102 and detectors 104) in accordance with one or more embodiments of the present invention. In some embodiments, tool body 108 includes one or more slots 300 that facilitate repositioning of source 102 and/or detectors 104. For example, a portion of source 102 and/or detectors 104 may couple to slot 300. To reposition source 102 and/or detectors 104, the respective device may be slide along slot 300 as illustrated by arrows 302*a*, 302*b*, 302*c* and 302*d*, respectively. For example, when changing from first tool configuration 100' to second tool configuration 100" (as described herein with regard to FIGS. 3A and 3B), source 102 may not be moved along slot 300, near detector 104*a* may be slide upward 75 mm within slot 300, middle detector 104*b* may be slid upward 100 mm within slot 300 and far detector 104*c* may be slid upward 150 mm within slot 300. Such a slot configuration may provide a large number of possible configurations as positions of source 102 and/or detectors 104 can be moved to various positions along slot 300. Once positioned, each of source 102 and/or detectors 104 may be secured in its position such that it does not move relative to the other devices and/or tool body 108. For example, once slid into position, each of source 102 and/or detectors 104 may be secured via a locking pin, a blot, screw, or similar fastening device that engages tool body 108 to inhibit longitudinal movement of the device relative to the tool body 108 and/or the other devices.

In some embodiments, a single slot is provided (as depicted in FIG. 4A). In some embodiments multiple slots are provided (as depicted in FIG. 4B). For example, a slot may be provided for each of source 102, near detector 104*a*, middle detector 104*b* and/or far detector 104*a*. FIG. 4B illustrates logging tool 100 employing multiple slots 300. In the illustrated embodiment, a source slot 300*a*, a near detector slot 300*b*, a middle detector slot 300*c* and a far detector slot 300*d* are provided for each of source 102, near detector 104*a*, middle detector 104*b* and far detector 104*a*, respectively. In such an embodiment, each of the source 102, near detector 104*a*, middle detector 104*b* and far detector 104*c* may be repositioned by sliding them longitudinally (e.g., up or down) within the respective source slot 300*a*, near detector slot 300*b*, middle detector slot 300*c* and far detector slot 300*d*. Separates slot may help to limit the range in which the detectors can be positioned. This may be particularly desirable in instances in which the positioning of one or more of source 102 and/or detectors 104 should be limited to a given range.

Figure 5:
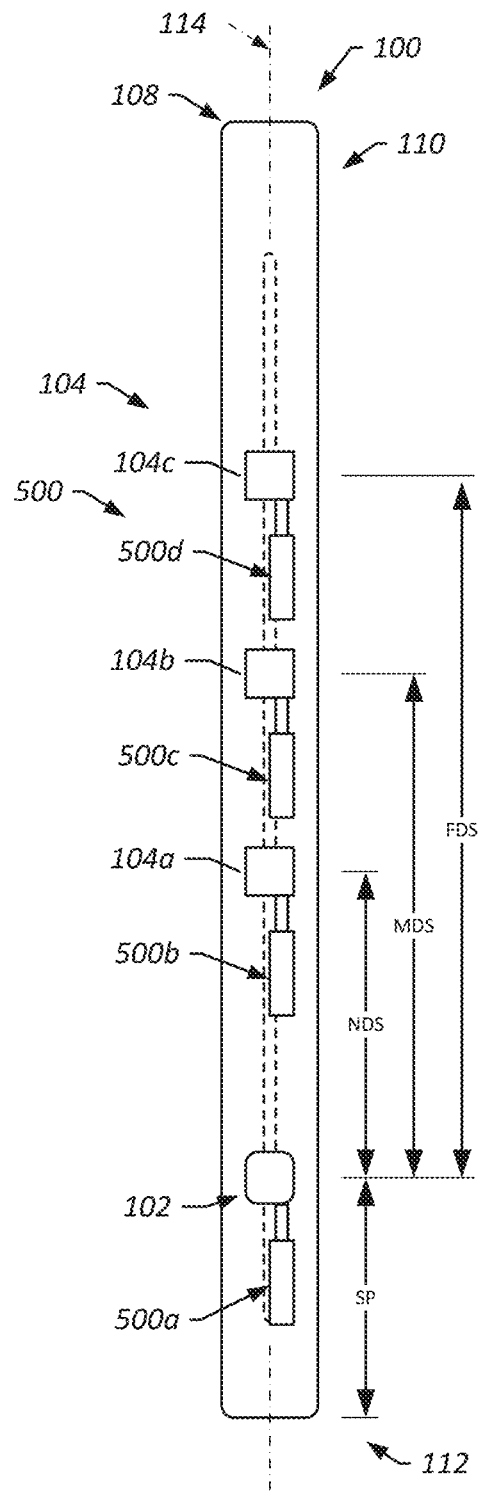
FIG. 5 illustrates a customizable logging tool employing automatically repositionable measurement devices in accordance with one or more embodiments of the present invention.

FIG. 5 illustrates a customizable logging tool 100 employing automatically repositionable measurement devices (e.g., source 102 and detectors 104) in accordance with one more embodiments of the present invention. In some embodiments, logging tool 100 may include one or more positioning devices 500 that provide for adjusting the positions (e.g., moving) of source 102 and/or detectors 104. For example, in the illustrated embodiment, a source positioning device 500*a*, a near detector positioning device 500*b*, a middle detector positioning device 500*c*, and a far detector positioning device 500*d* may provide for moving/positioning of source 102, near detector 104*a*, middle detector 104*b* and far detector 104*c* respectively. In some embodiments, positions of the automatically repositionable measurement devices can be adjusted at the surface and/or down-hole. For example, while logging tool 100 is down-hole, logging tool electronics 106 may engage positioning devices 500 to move source 102 and/or detectors 104 into their respective positions to provide optimal source-to-detector spacings for a given set of logging conditions. Such down-hole adjustability may be particularly advantageous as logging tool 100 may be re-configured to suit varying down-hole logging conditions without having to retrieve logging tool 100 to the surface. In some embodiments, the automatic adjustments are controlled by logging control system 216. For example, logging control system 216 may determine positions of source 102 and/or detectors 104 to achieve optimal source-to-detector spacings for a given set of logging conditions, and command logging tool electronics 106 to engage positioning devices 500*a*, 500*b*, 500*c* and/or 500*d* to move source 102, detector 104*a*, detector 104*b*, detector 104*c* and/or detector 104*d*, respectively, into positions that provide the optimal source-to-detector spacings.

In some embodiments, positioning devices 500 may include actuators or other devices that can provide for repositioning measurement devices. For example, each of positioning devices 500*a*, 500*b*, 500*c*, and 500*d* may include a hydraulic actuator, electrical actuator, pneumatic actuator, mechanical actuator, or the like that is activated or otherwise engaged by logging tool electronics 106 to move each of the source 102 and/or detectors 104 into their respective positions to provide optimal source-to-detector spacings for a given set of logging conditions.

Figure 6:
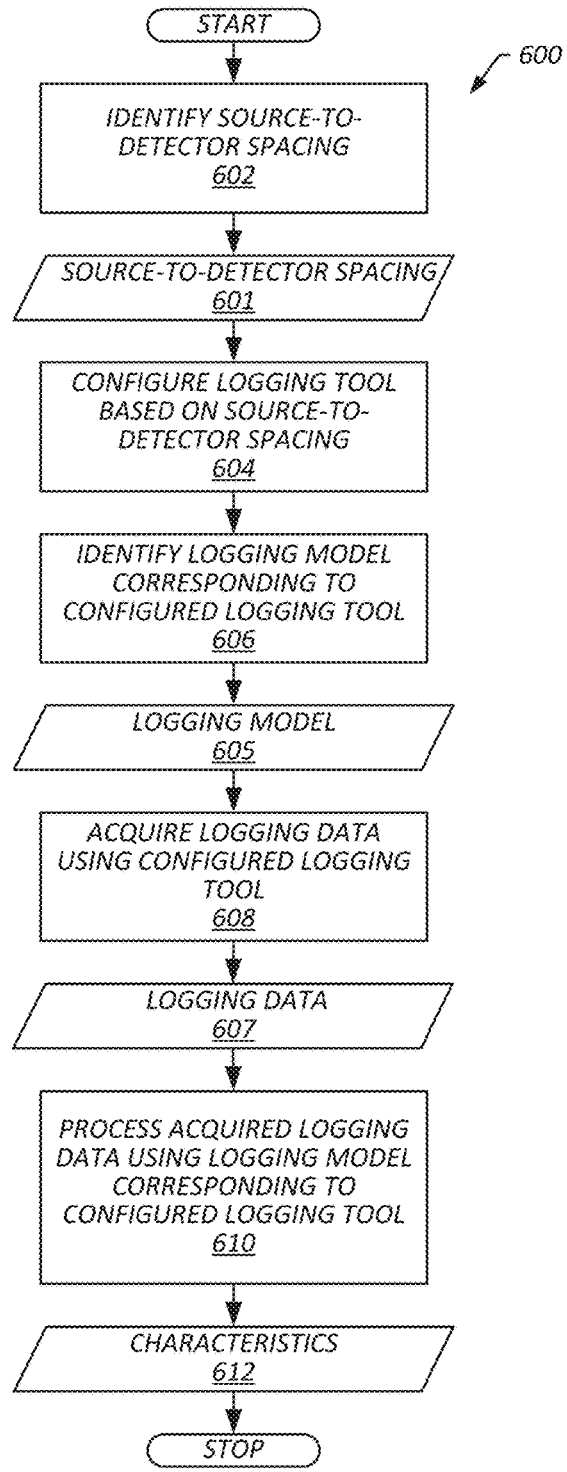
FIG. 6 is a flowchart that illustrates a method of downhole logging using a customizable logging tool in accordance with one or more embodiments of the present invention.

FIG. 6 is a flowchart that illustrates a method 600 of down-hole logging using a customizable logging tool in accordance with one or more embodiments of the present invention. Method 600 generally includes identifying a source-to-detector spacing (block 602), configuring a logging tool based on the source-to-detector spacing (block 604), identifying a logging model corresponding to configured logging tool (block 606), acquiring logging data using the configured logging tool (block 608), and processing the acquired logging data using the logging model (block 610). In some embodiments, method 600 is performed by one or more modules of logging control system 216 and/or logging tool electronics 106.

In some embodiments, identifying a source-to-detector spacing (block 602) includes identifying an optimal source-to-detector spacing 601 for each of the plurality of detectors of the logging tool 100 based at least in part on a set of logging conditions. The logging conditions may include characteristics of the reservoir, the logging tool, the types of measurements to be acquired, the borehole and/or the like.

Reservoir characteristics may include, for example, reservoir lithology (e.g., carbonate, clastics, or shale), reservoir porosity (e.g., low, intermediate, or high), reservoir fluids (e.g., water (fresh or saline), oil (light or heavy), gas, enhanced oil recovery (EOR) fluids), reservoir saturation (e.g., low or high water saturation (Sw)), reservoir pressure (e.g., low, medium, high), reservoir temperature (e.g., low, medium, or high), and/or the like. Tool characteristics may include, for example, source/generator type and power, detector types/sizes. Measurement characteristics may include type of logging (e.g., detector counts (e.g., thermal neutron capture or inelastic scattering, carbon-oxygen (CO) logging or sigma logging) and/or the like. Borehole characteristics may include borehole size, borehole completion type (e.g., openhole or casedhole), borehole fluid (e.g., water, oil, gas, holdup (low or high)), borehole pressure, borehole temperature and/or the like.

Figure 11:
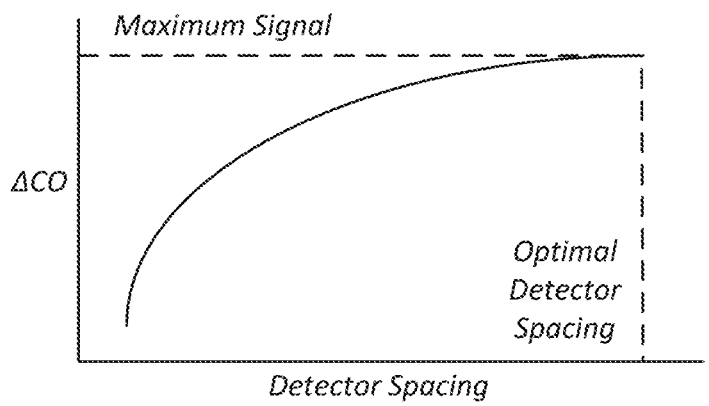
FIG. 11 is a plot of carbon-oxygen ratio vs. detector spacing in accordance with one or more embodiments of the present invention.

It will be appreciated that optimal detector spacing may vary as a function of logging conditions, such as a difference between carbon/oxygen (C/O) ratio of a reservoir saturated with oil and a reservoir saturated with water (ΔCO). FIG. 11 is a schematic plot of carbon-oxygen ratio vs. detector spacing in accordance with one or more embodiments of the present invention. As illustrated, the reservoir sensitivity of ΔCO (or the dynamic range of CO log) increases with detector spacing, to a certain extent. If a detector is too close to the source, its signals will be dominated by the borehole. If a detector is too far away from the source, little signal may exist in the range of the detector. In some embodiments, this type of relationship can be used to determine optimal detector spacing 601.

Figure 9:
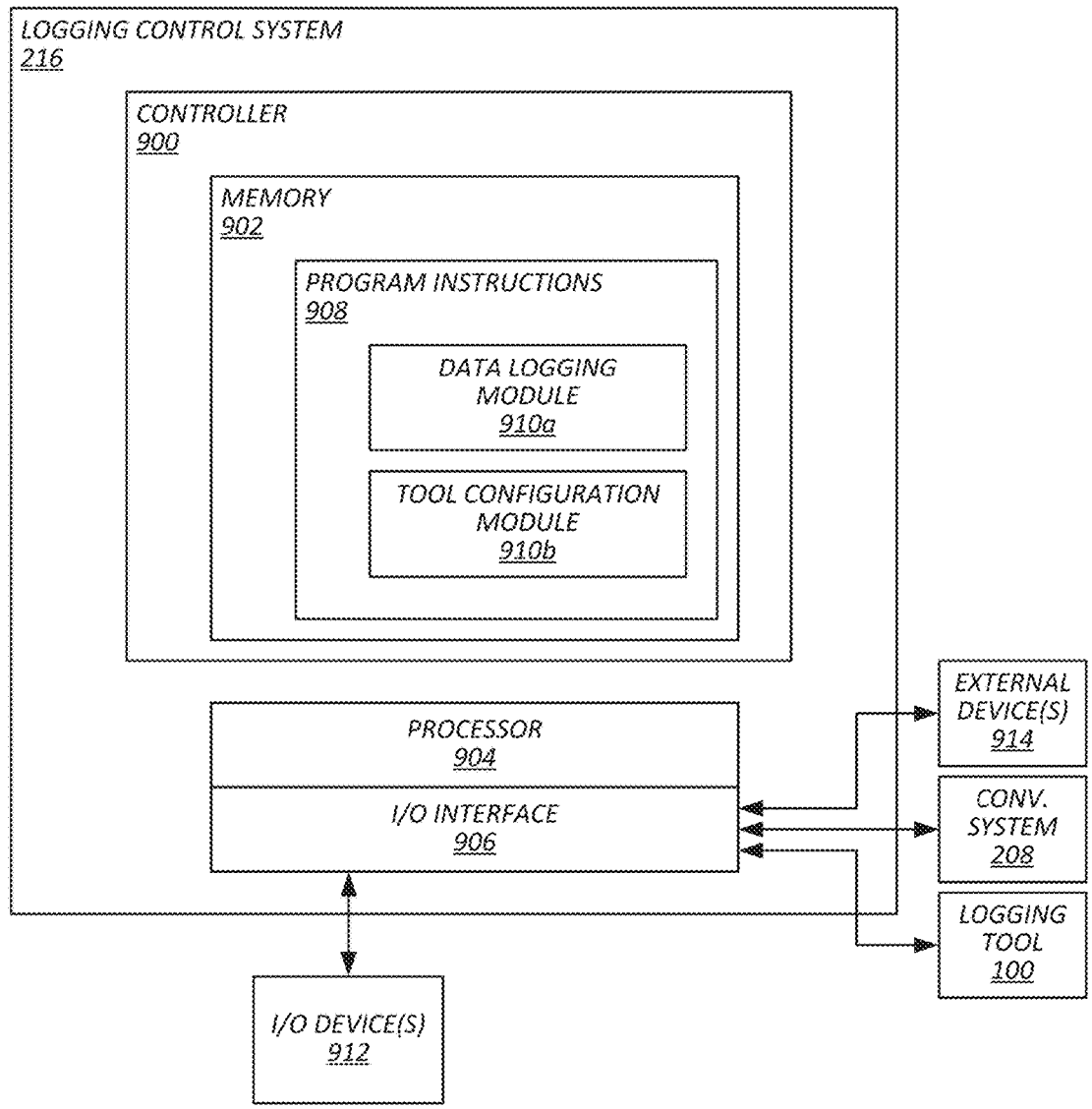
FIG. 9 is a block diagram that illustrates a logging control system in accordance with one or more embodiments of the present invention.

In some embodiments, identifying an optimal source-to-detector spacing for a given set of logging conditions include identifying a set of current logging conditions for which logging tool 100 is to be used, accessing a stored index of optimal source-to-detector spacing vs. logging conditions (e.g., a look-up-table stored in memory 902 described with regard to at least FIG. 9), identifying a set of logging conditions of the index that matches (or at least most closely matches) the current logging conditions, and identifying the optimal source-to-detector spacing corresponding to the logging conditions of the index that matches (or at least most closely matches) the current logging conditions. In some embodiments, identifying an optimal source-to-detector spacing for a given set of logging conditions include dynamically calculating optimal source-to-detector spacings based at least in part on a set of current logging conditions for which logging tool 100 is to be used. For example, an algorithm may be run that calculates optimal source-to-detector spacings for the logging tool based at least in part on characteristics of the reservoir, the logging tool, the types of measurements to be acquired, the borehole and/or the like.

In an exemplary embodiment, identifying an optimal source-to-detector spacing for using a logging tool 100 under a first set of logging conditions (e.g., for logging a first borehole) includes determining a near detector spacing (NDS) of 200 mm, a middle detector spacing (MDS) of 350 mm, and a far detector spacing (FDS) of 650 mm (e.g., corresponding to logging tool configuration 100' of FIG. 3A). In an exemplary embodiment, identifying an optimal source-to-detector spacing for using a logging tool 100 under a second set of logging conditions (e.g., for logging a second borehole at a first depth) includes determining a near detector spacing (NDS) of 275 mm, a middle detector spacing (MDS) of 450 mm, and a far detector spacing (FDS) of 800 mm (e.g., corresponding to logging tool configuration 100" of FIG. 3B). In yet another exemplary embodiment, identifying an optimal source-to-detector spacing for using a logging tool 100 under a third set of logging conditions (e.g., for logging the second borehole at a second depth) includes determining a near detector spacing (NDS) of 175 mm, a middle detector spacing (MDS) of 225 mm, and a far detector spacing (FDS) of 500 mm (e.g., corresponding to logging tool configuration 100''' of FIG. 3B).

In some embodiments, configuring a logging tool based on the source-to-detector spacing (block 604) includes adjusting positions of source 102 and/or detectors 104 to achieve the identified source-to-detector spacings 601. For example, where logging tool 100 is to be used in the first set of conditions, configuring logging tool 100 based on the source-to-detector spacings may include moving source 102, near detector 104a, middle detector 104b and far detector 104c into positions that provide a near detector spacing (NDS) of 200 mm, a middle detector spacing (MDS) of 350 mm, and a far detector spacing (FDS) of 650 mm (e.g., corresponding to logging tool configuration 100' of FIG. 3A). In some embodiments, configuring a logging tool includes manual repositioning of source 102, near detector 104a, middle detector 104b and/or far detector 104c. For example, an operator may receive an indication of the optimal source-to-detector spacings, and move each of source 102, near detector 104a, middle detector 104b and/or far detector 104c into positions corresponding to the optimal source-to-detector spacings. In some embodiments, configuring a logging tool includes automatically repositioning of source 102, near detector 104a, middle detector 104b and/or far detector 104c. For example, if logging tool 100 includes automatically repositionable measurement devices (e.g., source 102 and/or detectors 104 movable by positioning devices 500 as depicted and described with regard to at least FIG. 5) logging control system 216 may issue a command to logging tool electronics 106 requesting source 102, near detector 104a, middle detector 104b and/or far detector 104c be moved into positions corresponding to the optimal source-to-detector spacings. Logging tool electronics 106 may, in turn, activate positioning devices 500 to automatically move each of source 102, near detector 104a, middle detector 104b and/or far detector 104c into positions corresponding to the optimal source-to-detector spacings. In some embodiments, automatically moving each of source 102, near detector 104a, middle detector 104b and/or far detector 104c into positions corresponding to the optimal source-to-detector spacings is achieved while the logging tool is downhole (e.g., while logging tool 100 is disposed in borehole 202).

Figure 7:
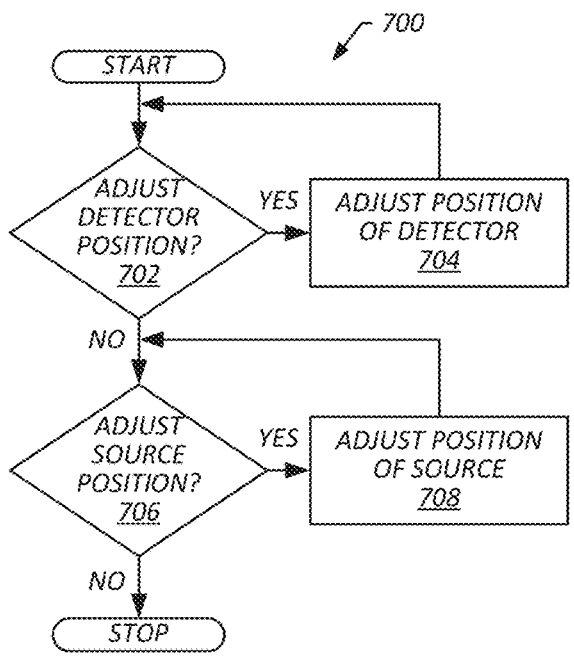
FIG. 7 is a flowchart that illustrates a method of configuring a customizable logging tool in accordance with one or more embodiments of the present invention.

FIG. 7 is a flowchart that illustrates a method 700 of configuring a customizable logging tool in accordance with one or more embodiments of the present invention. Method 700 generally includes determining whether a detector position needs to be adjusted (block 702) and, if so adjusting the position of the detector (block 704). Method 700 also includes determining whether a source position needs to be adjusted (block 706) and, if so adjusting the position of the source (block 708). Thus, for example, if logging tool 100 is provided in the first configuration 100' and it is determined that logging tool needs to be adjusted to the second configuration 100" to provide optimal source-to-detectors spacings (e.g., to configure the logging tool 100 for logging of the second borehole after it was used to log the first borehole), it may be determined that near detector 104a needs to be moved downward 25 mm (at a first iteration through block 702) and middle detector 104b may be moved downward 25 mm (at a first iteration through block 704), it may be determined that middle detector 104b needs to be moved upward 50 mm (at a second iteration through block 702) and middle detector 104b may be moved upward 50 mm (at a second iteration through block 704), it may be determined that far detector 104c needs to be moved upward 100 mm (at a third iteration through block 702) and far detector 104b may be moved upward 100 mm (at a third iteration through block 704), and it may be determined that source 102 does not need to be moved (at a first interaction through block 706). In some embodiments, adjusting positions of detectors and/or a source is provided manually. For example, an operator may manually move the respective source or detectors. In some embodiments, adjusting positions of detectors and/or a source is provided automatically. For example, if logging tool 100 includes automatically repositionable measurement devices (e.g., source 102 and/or detectors 104 movable by positioning devices 500 as depicted and described with regard to at least FIG. 5) logging control system 216 may issue a command to logging tool electronics 106 requesting source 102, near detector 104a, middle detector 104b and/or far detector 104c be moved into positions corresponding to the optimal source-to-detector spacings. Logging tool electronics 106 may, in turn, activate positioning devices 500 to automatically move each of source 102, near detector 104a, middle detector 104b and/or far detector 104c into positions corresponding to the optimal source-to-detector spacings. In some embodiments, automatically moving each of source 102, near detector 104a, middle detector 104b and/or far detector 104c into positions corresponding to the optimal source-to-detector spacings is achieved while the logging tool is downhole (e.g., while logging tool 100 is disposed in borehole 202).

In some embodiments, identifying a logging model corresponding to configured logging tool (block 606) includes identifying a logging model 605 that corresponds to the source-to-detector spacing of the configured ('customized') logging tool and the logging conditions in which the customized logging tool is to be used. In some embodiments, identifying a logging model includes identifying accessing a stored index (e.g., a look-up-table) of logging models vs. logging conditions (including the configuration of a logging tool), identifying a logging condition of the index that match (or at least most closely match) the current logging conditions (including the configuration of the customized logging tool), and identifying a logging model corresponding to the logging conditions of the index that match (or at least most closely match) the current logging conditions. In some embodiments, a logging model that corresponds to the source-to-detector spacing of the customized logging tool includes dynamically generating a logging model based at least in part on the current logging conditions (including the configuration of the customized logging tool). For example, an algorithm may be run that generates a logging model based on the current logging conditions (including the configuration of customized logging tool 100). As described herein, the identified logging model may be used for processing/interpreting logging data acquired using the customized logging tool.

In some embodiments, acquiring logging data using the configured logging tool (block 608) includes acquiring logging data 607 using the customized logging tool. For example, acquiring logging data using the configured logging tool may include logging control system 216 transmitting a signal to logging tool electronics 106 commanding initiation and/or termination of a logging operation using the customized tool (e.g., logging tool configuration 100'). Logging tool electronics 106 may, in turn, conduct a logging sequence that includes providing corresponding logging data to logging control system 216. During a logging operation logging tool electronics 106 may receive a command (e.g., a command from a surface based control system) to conduct a logging sequence, and, in response to the command, logging tool electronics 106 may conduct a logging sequence. The logging sequence may include, for example, logging control system 216 activating source 102 (e.g., causing source 102 to emit signals into the surrounding formation), monitoring signals received from detectors 104a, 104b and 104c (e.g., signals that are indicative of the signals sensed by detectors 104a, 104b and 104c), and generating corresponding logging data (e.g., transmitting logging data that is indicative of the signals sensed by detectors 104a, 104b and 104c to the surface based control system).

Figure 12:
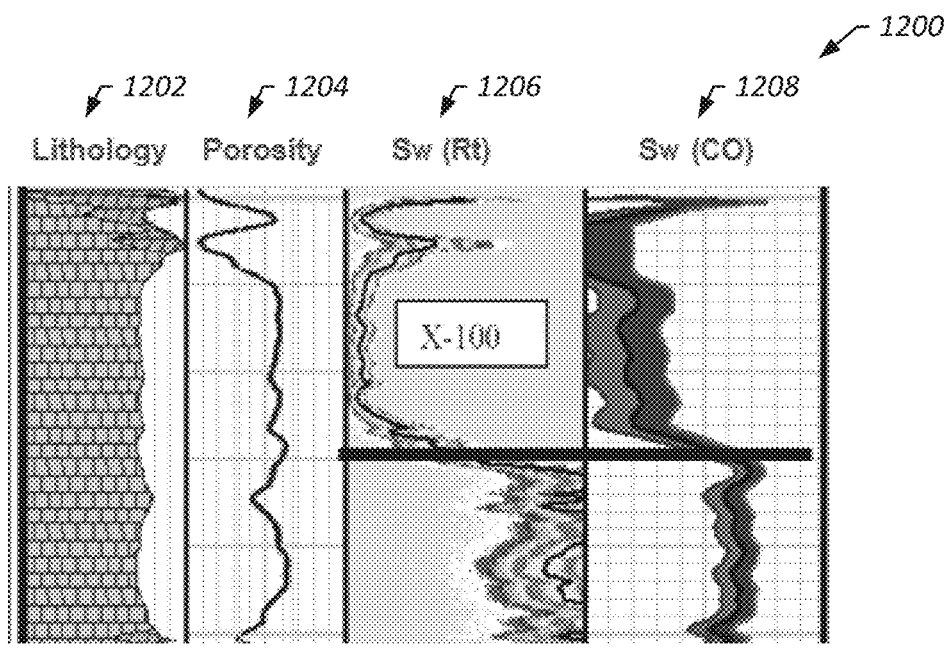
FIG. 12 is an exemplary graphical diagram illustrating enhanced results from an embodiment of a logging tool showing uncertainty of reservoir saturation monitoring using resistivity (Rt) and CO in accordance with one or more embodiments of the present invention.

In some embodiments, processing the acquired logging data using the logging model (block 610) includes processing the acquired logging data 607 using logging model 605 to determine one or more characteristics 612 of the formation and/or the borehole. For example, the acquired logging data 607 may be processed using logging model 605 to determine reservoir lithology, porosity, water saturation and its uncertainty from resistivity and CO logs and/or generate a log thereof. FIG. 12 illustrates an exemplary borehole log 1200 in accordance with one or more embodiments of the present invention. Borehole log 1200 may be generated using logging data acquired via customizable logging tool 100. In the illustrated embodiment, borehole log 1200 includes track 1 showing reservoir lithology (1202), track 2 showing reservoir porosity (1204), track 3 showing reservoir water saturation uncertainty from a resistivity log (1206), and track 4 showing reservoir water saturation uncertainty from a CO log (1208). Borehole log 1200 may be generated using reservoir lithology, porosity, and water saturation and its uncertainties determined as a result of processing logging data 607 using logging model 605.

It will be appreciated that methods 600 and 700 are exemplary embodiments of methods that may be employed in accordance with techniques described herein. The methods 600 and 700 may be modified to facilitate variations of its implementations and uses. The order of the methods 600 and 700 and the operations provided therein may be changed, and various elements may be added, reordered, combined, omitted, modified, etc. The methods 600 and 700 may be implemented in software, hardware, or a combination thereof. Some or all of the methods 600 and 700 may be implemented by one or more of the modules/applications described herein.

Figure 8:
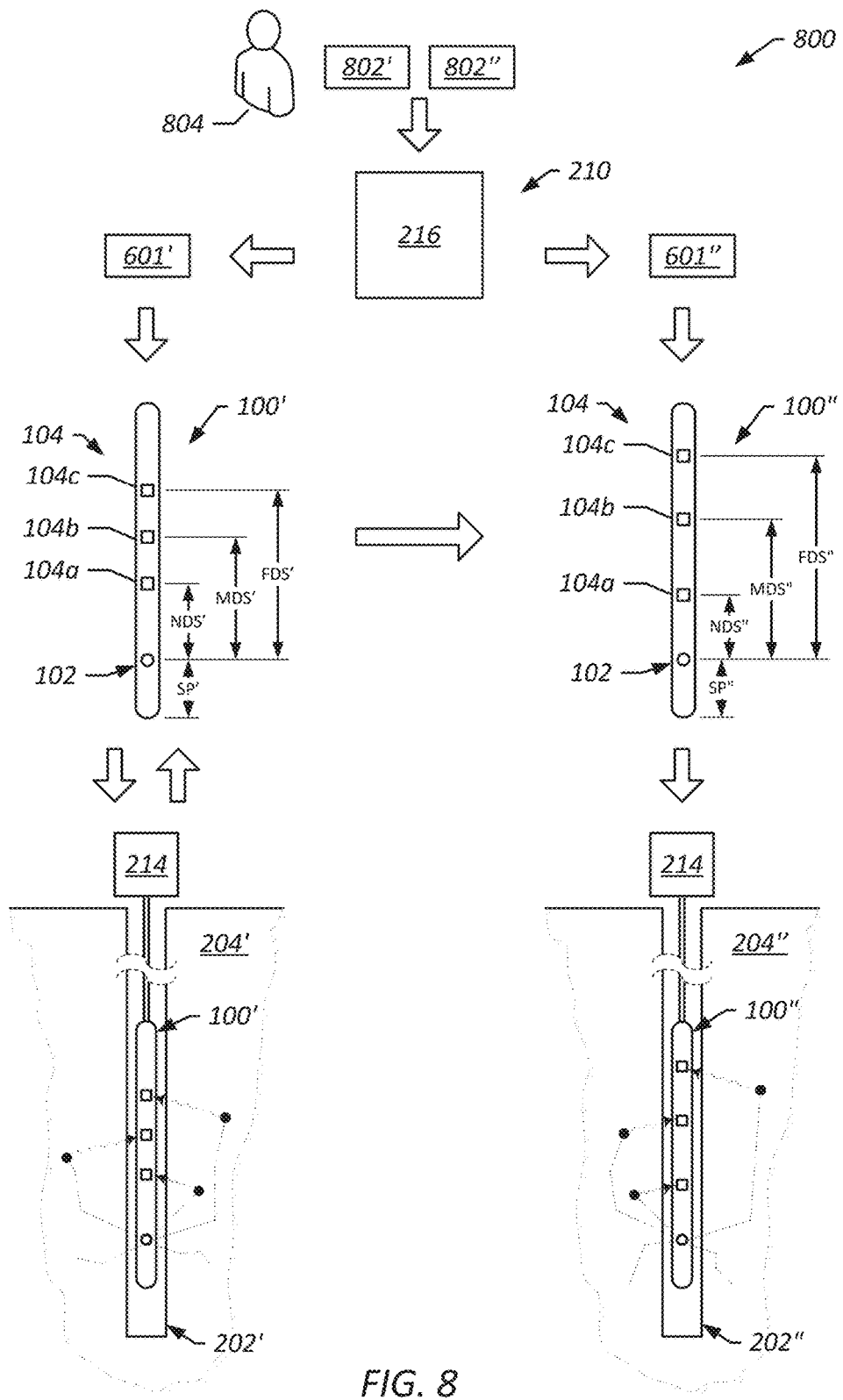
FIG. 8 is a flow diagram that illustrates exemplary configurations and use of a customizable logging tool in accordance with one or more embodiments of the present invention.

FIG. 8 is a flow diagram 800 that illustrates exemplary configuration and use of customizable logging tool 100 in accordance with one or more embodiments of the present invention. During a first logging operation, logging control system 216 may identify an optimal source-to-detector spacing 601' for a first set of logging conditions 802' corresponding to logging a first borehole 202'. In some embodiments, identifying an optimal source-to-detector spacing includes logging control system 216 calculating the optimal source-to-detector spacings for the given set of logging conditions or accessing a stored set of optimal source-to-detector spacings for the given set of logging conditions. Optimal source-to-detector spacings may be stored in a memory (e.g., memory 902) of logging control system 216.

In some embodiments, logging conditions are provided by a user. For example, a user 804 may submit logging conditions 802' via a user interface of logging control system 216. In some embodiments, the logging conditions are automatically acquired or otherwise determined. For example, logging control system 216 may determine logging conditions 802' based on previously acquired data for the borehole and/or the reservoir to be logged and/or similar boreholes and reservoirs. Logging conditions may be stored in memory (e.g., memory 902) of logging control system 216.

In some embodiments, logging tool 100 may be configured based on a first optimal source-to-detector spacing 601'. For example, logging tool 100 may be configured as discussed above with regard to at least customized logging tool 100' and FIG. 3A. Logging tool (in the first configuration) 100' may, then, be used to log first borehole 202'. Logging data 607' for first borehole 202' acquired using logging tool 100' may then be used to determine various characteristics of first borehole 202' and reservoir 204' and/or generate a log thereof.

In some embodiments, the same logging tool may be used to log a second borehole 202" in a second set of logging conditions 802" (e.g., logging conditions that are different from the first set of logging conditions 802'). During a second logging operation, logging control system 216 may identify an optimal source-to-detector spacing 601" for second set of logging conditions 802' corresponding to logging second borehole 202". Logging tool 100' may be re-configured based on optimal source-to-detector spacing 601". For example, logging tool 100' may be reconfigured as discussed above with regard to at least customized logging tool 100" and FIG. 3B (e.g., adjusting/moving source 102 and/or detectors 104 from the positions in the first logging tool configuration 100' to the positions of the second logging tool configuration 100"). Logging tool 100" may, then, be used to log second borehole 202". Logging data 607" for second borehole 202" acquired using logging tool 100" may then be used to determine various characteristics of second borehole 202" and reservoir 204" and/or generate a log thereof.

In some embodiments, the reconfiguration of a logging tool may continue as the same tool is re-used in different logging conditions. For example, if logging tool 100 is next used to log second borehole 202" at another depth corresponding to a third set of logging conditions, logging tool 100" may be re-configured (based on optimal source-to-detector spacing for the third set of logging conditions) and used to log the second borehole 202" at the given depth.

FIG. 9 is a block diagram that illustrates a logging control system 216 in accordance with one or more embodiments of the present invention. In some embodiments, logging control system 216 includes a controller 900 for controlling the operational aspects of logging control system 216. In some embodiments, controller 900 includes a memory 902, a processor 904 and an input/output (I/O) interface 906. Memory 902 may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. Memory 902 may include a non-transitory computer readable storage medium having program instructions 908 stored thereon that are executable by a computer processor (e.g., processor 904) to cause the functional operations (e.g., methods/routines/processes) described herein with regard to logging control system 216. Program instructions 908 may include modules including program instructions that are executable by processor 904 to provide some or all of the functionality described herein with regard to logging control system 216. Program instructions 908 may include, for example, a logging control module 910a for performing some or all of the operational aspects of method 600 (described herein with regard to at least FIG. 6) and/or a tool configuration module 910b for performing some or all of the operational aspects of method 700 (described herein with regard to at least FIG. 7).

Processor 904 may be any suitable processor capable of executing/performing program instructions. Processor 904 may include a central processing unit (CPU) that carries out program instructions (e.g., program instructions of modules 910a and/or 910b) to perform arithmetical, logical, and input/output operations of logging control system 216, including those described herein. I/O interface 906 may provide an interface for communication with one or more I/O devices 912, conveyance system 208, logging tool 100 (e.g., logging tool electronics 106), and/or other external device(s) 914. I/O devices may include a mouse/keyboard/touchscreen, a graphical user interface (GUI), and/or the like. Devices may be connected to I/O interface 906 via a wired or wireless connection.

Figure 10:
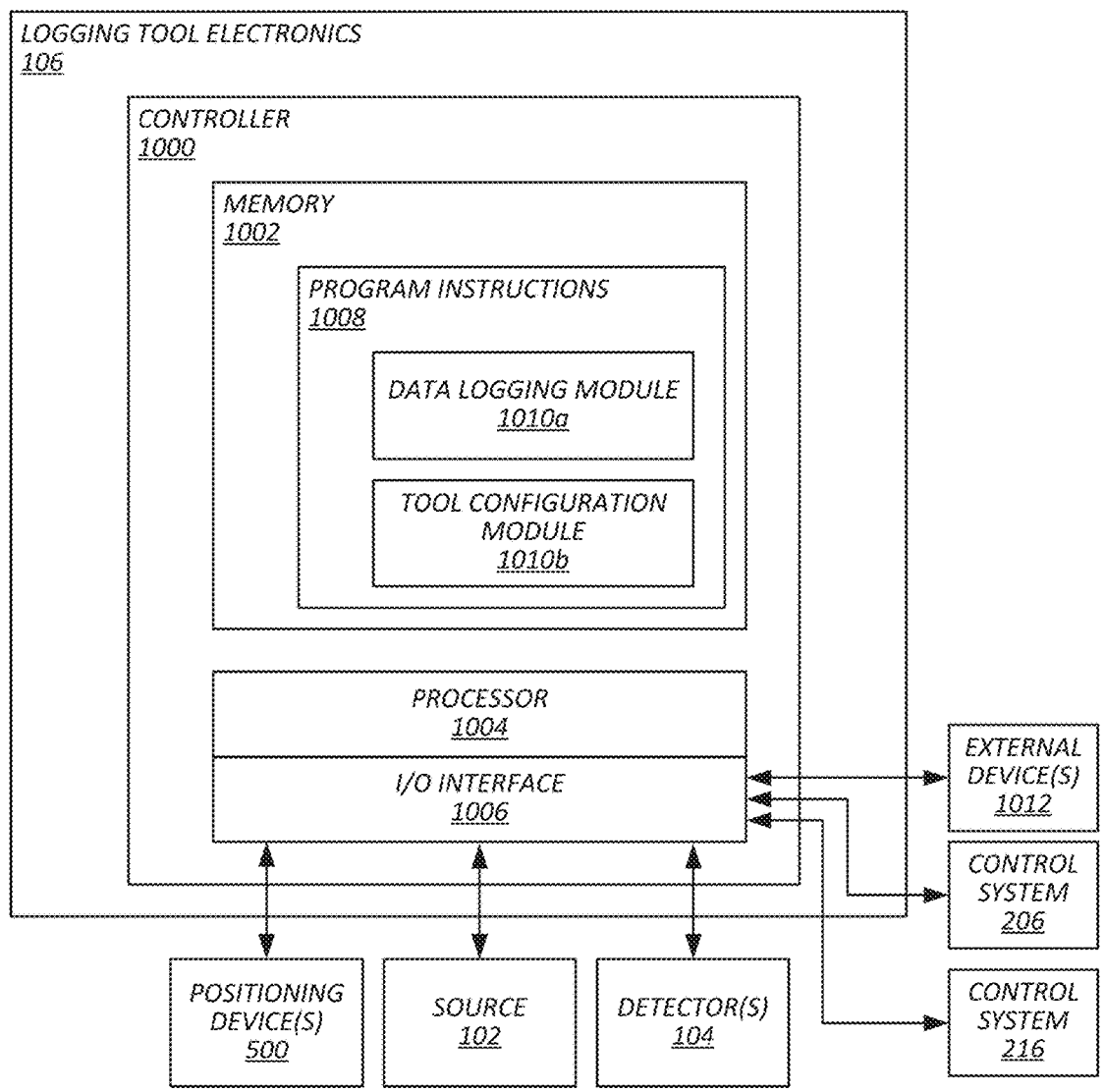
FIG. 10 is a block diagram that illustrates logging tool electronics in accordance with one or more embodiments of the present invention.

FIG. 10 is a block diagram that illustrates logging tool electronics 106 in accordance with one or more embodiments of the present invention. In some embodiments, logging tool electronics 106 includes a controller 1000 for controlling the operational aspects of logging tool electronics 106. In some embodiments, controller 1000 includes a memory 1002, a processor 1004 and an input/output (I/O) interface 1006. Memory 1002 may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. Memory 1002 may include a non-transitory computer readable storage medium having program instructions 1008 stored thereon that are executable by a computer processor (e.g., processor 1004) to cause the functional operations (e.g., methods/routines/processes) described herein with regard to logging tool electronics 106. Program instructions 1008 may include modules including program instructions that are executable by processor 1004 to provide some or all of the functionality described herein with regard to logging tool electronics 106. Program instructions 1008 may include, for example, a data logging module 1010a for performing some or all of the operational aspects of method 600 (described herein with regard to at least FIG. 6) and/or a tool configuration module 1010b for performing some or all of the operational aspects of method 700 (described herein with regard to at least FIG. 7).

Processor 1004 may be any suitable processor capable of executing/performing program instructions. Processor 1004 may include a central processing unit (CPU) that carries out program instructions (e.g., program instructions of modules 1010a and/or 1010b) to perform arithmetical, logical, and input/output operations of logging tool electronics 106, including those described herein. I/O interface 1006 may provide an interface for communication with one or more positioning device(s) 500, source 102, detector(s) 104, conveyance system 208, control system 210, logging control system 206, and/or other external device(s) 1012. Devices may be connected to I/O interface 1006 via a wired or wireless connection.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" may include a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A borehole pulsed neutron (PN) logging system comprising:
   a pulsed neutron (PN) logging tool configured to be disposed in a borehole formed in a geologic reservoir, the PN logging tool comprising:
   a tool body;
   a pulsed neutron (PN) source configured to emit neutrons into the geologic reservoir surrounding the borehole, a position of the PN source being fixed relative to the tool body;
   a plurality of gamma ray detectors configured to detect gamma rays generated as a result of emission of neutrons by the PN source into the geologic reservoir surrounding the borehole, the plurality of independently positionable gamma ray detectors comprising:
      a near gamma ray detector configured to be positioned at a first longitudinal distance from the neutron source;
      a middle gamma ray detector configured to be positioned at a second longitudinal distance from the neutron source, the second longitudinal distance being greater than the first longitudinal distance; and
      a far gamma ray detector configured to be positioned at a third longitudinal distance from the neutron source, the third longitudinal distance being greater than the second longitudinal distance,
      positioning of each of the near, middle and far gamma ray detectors is independently adjustable relative to the tool body such that spacing between the neutron source and each of the near, middle and far gamma ray detectors is variable independent of spacing between the neutron source and others of the near, middle and far gamma ray detectors, wherein the positions of the detectors are configured to be dynamically repositioned along a longitudinal axis of the tool body while the logging tool is disposed in the borehole; and
   a pulsed neutron (PN) logging control system configured to:
      determine the first, second and third longitudinal distances based at least in part on:
         one or more characteristics of the geologic reservoir surrounding the borehole;
         one or more characteristics of the borehole;
         one or more characteristics of the neutron source;
         one or more characteristics of the gamma ray detectors; and
         one or more characteristics of the geologic reservoir to be determined;
      generate a customized reservoir model corresponding to the PN logging tool having the near gamma ray detector positioned at the first longitudinal distance, the middle gamma ray detector positioned at the second longitudinal distance, and the far gamma ray detector positioned at the third longitudinal distance;
      acquire logging data utilizing the PN logging tool with the near gamma ray detector positioned at the first longitudinal distance, the middle gamma ray detector positioned at the second longitudinal distance, and the far gamma ray detector positioned at the third longitudinal distance; and
      process the acquired logging data utilizing the customized reservoir model to determine one or more characteristics of the geologic reservoir surrounding the borehole.

2. A logging tool configured to be disposed in a borehole formed in a geologic formation, the logging tool comprising:
   a source configured to emit signals into the geologic formation surrounding the borehole;
   a plurality of detectors configured to detect signals generated as a result of emission of signals by the source into the geologic formation surrounding the borehole, the plurality of detectors being independently repositionable such that a source-to-detector spacing for the detectors is independently variable, wherein the positions of the detectors are configured to be dynamically repositioned along a longitudinal axis of the logging tool while the logging tool is disposed in the borehole; and
   a logging control system configured to:
      determine the source-to-detector spacing for the plurality of detectors based at least on:
         one or more characteristics of the geologic reservoir surrounding the borehole;
         one or more characteristics of the borehole;
         one or more characteristics of the source;
         one or more characteristics of the detectors; and
         one or more characteristics of the geologic reservoir to be determined;
      generate a customized reservoir model corresponding to the logging tool having the plurality of detectors positioned at respective distances from the source;
      acquire logging data utilizing the logging tool with the plurality of detectors positioned at the respective distances from the source; and
      process the acquired logging data utilizing the customized reservoir model to determine one or more characteristics of the geologic reservoir surrounding the borehole.

3. The logging tool of claim 2, wherein the source comprises a pulsed neutron source configured to emit neutrons into the geologic formation surrounding the borehole, and wherein the plurality of detectors comprise a plurality of gamma ray detectors configured to detect gamma rays generated as a result of emission of neutrons by the PN source into the geologic formation surrounding the borehole.

4. The logging tool of claim 2, wherein the plurality of detectors comprise:
a near detector configured to be positioned at a first spacing from the neutron source;
a middle detector configured to be positioned at a second spacing from the neutron source, the second spacing being greater than the first spacing; and
a far detector configured to be positioned at a third spacing from the neutron source, the third spacing being greater than the second spacing.

5. The logging tool of claim 2, further comprising a tool body, wherein the logging tool is configured to be disposed in the borehole such that the longitudinal axis of the tool body is substantially aligned with a longitudinal axis of the borehole, wherein positioning of the detectors is independently adjustable relative to the tool body in a longitudinal direction substantially parallel to the longitudinal axis of the tool body such that source-to-detector spacing for each of the detectors is variable in the longitudinal direction.

6. The logging tool of claim 5, wherein a position of the source is fixed relative to the tool body.

7. The logging tool of claim 5, wherein a position of the source is adjustable relative to the tool body.

8. The logging tool of claim 5, wherein the logging tool comprises one or more slots extending in a longitudinal direction substantially parallel to the longitudinal axis of the tool body, wherein at least one of the plurality of detectors is repositionable in the longitudinal direction via sliding the detector along the slot.

9. The logging tool of claim 2, further comprising one or more repositioning devices configured to automatically reposition one or more of the detectors without manual intervention by a user.

10. The logging tool of claim 2, wherein the source comprises neutron source, a gamma ray source, a sonic transmitter or a resistivity/conductivity transmitter.

11. A method for down-hole logging utilizing a logging tool configured to be disposed in a borehole formed in a geologic formation, the logging tool comprising a source configured to emit signals into the geologic formation surrounding the borehole, and a plurality of detectors configured to detect signals generated as a result of emission of signals by the source into the geologic formation surrounding the borehole, positioning of the detectors being independently adjustable such that a source-to-detector spacing for the detectors is independently variable, the method comprising:
identifying a source-to-detector spacing for each of the plurality of detectors of the logging tool;
positioning each of the plurality of detectors of the logging tool at the respective source-to-detector spacings identified, wherein the positions of the detectors are configured to be dynamically repositioned along a longitudinal axis of the logging tool while the logging tool is disposed in the borehole;
generating a customized reservoir model corresponding to the logging tool having the plurality of detectors positioned at the respective source-to-detector spacings;
disposing the logging tool into the borehole to acquire logging data utilizing the logging tool with the plurality of detectors positioned at the respective source-to-detector spacings determined; and
processing the acquired logging data utilizing the customized reservoir model to determine one or more characteristics of the geologic reservoir surrounding the borehole.

12. The method of claim 11, wherein positioning each of the plurality of detectors of the logging tool at the respective source-to-detector spacings identified comprises physically repositioning one or more of the plurality of detectors relative to the source of the logging tool.

13. The method of claim 11, wherein positioning each of the plurality of detectors of the logging tool at the respective source-to-detector spacings identified comprises independently moving two or more of the plurality of detectors independent from one another to the respective source-to-detector spacings.

14. The method of claim 11, wherein positioning each of the plurality of detectors of the logging tool at the respective source-to-detector spacings identified comprises:
physically moving a first of the plurality of detectors a first distance relative to the source of the logging tool; and
physically moving a second of the plurality of detectors a second distance relative to the source of the logging tool, wherein the first distance is different from the second distance.

15. A method for down-hole logging utilizing a logging tool configured to be disposed in a borehole formed in a geologic formation, the logging tool comprising a source configured to emit signals into the geologic formation surrounding the borehole a plurality of detectors configured to detect signals generated as a result of emission of signals by the source into the geologic formation surrounding the borehole, positioning of the detectors is independently adjustable such that source-to-detector spacing for each of the detectors is independently variable, the method comprising:
determining a source-to-detector spacing for each of the plurality of detectors of the logging tool;
identifying a geologic formation model corresponding to the logging tool having the plurality of detectors positioned at the respective source-to-detector spacings determined, wherein the positions of the detectors are configured to be dynamically repositioned along a longitudinal axis of the logging tool while the logging tool is disposed in the borehole;
acquiring logging data utilizing the logging tool with the plurality of detectors positioned at the respective source-to-detector spacings determined; and
processing the acquired logging data utilizing the customized geologic formation model to determine one or more characteristics of the geologic formation.

16. The method of claim 11, wherein determining a source-to-detector spacing for each of the plurality of detectors of the logging tool comprises determining a source-to-detector spacing for each of the plurality of detectors of the logging tool based at least in part on at least one of the following:
one or more characteristics of the geologic reservoir surrounding the borehole;
one or more characteristics of the borehole;
one or more characteristics of the neutron source;
one or more characteristics of the gamma ray detectors; and
one or more characteristics of the geologic reservoir to be determined.

17. A computer-implemented method for borehole logging, the method comprising:

identifying, by one or more processors, a set of logging conditions corresponding to logging of a borehole in a formation;

identifying, by the one or more processors, a source-to-detector spacing for each of the plurality of detectors of the logging tool, the source-to-detectors spacing being identified based at least in part on the set of logging conditions corresponding to logging of a borehole;

providing, by the one or more processors, for positioning each of the plurality of detectors of the logging tool at the respective source-to-detector spacings identified, wherein the positions of the detectors are configured to be dynamically repositioned along a longitudinal axis of the logging tool while the logging tool is disposed in the borehole;

identifying, by the one or more processors, a logging model corresponding to the logging conditions and the logging tool having the plurality of detectors positioned at the respective source-to-detector spacings identified;

receiving, by the one or more processors, logging data for the borehole from the logging tool having the plurality of detectors positioned at the respective source-to-detector spacings identified; and processing, by the one or more processors, the logging data using the logging model to identify one or more characteristics of the formation.

18. A non-transitory computer readable storage medium having program instructions stored thereon that are executable by one or more processors to cause the following steps for down-hole logging utilizing a logging tool configured to be disposed in a borehole formed in a geologic formation, the logging tool comprising a source configured to emit signals into the geologic formation surrounding the borehole, and a plurality of detectors configured to detect signals generated as a result of emission of signals by the source into the geologic formation surrounding the borehole, positioning of the detectors is independently adjustable such that source-to-detector spacing for each of the detectors is independently variable:

determining a source-to-detector spacing for each of the plurality of detectors of the logging tool;

identifying a geologic formation model corresponding to the logging tool having the plurality of detectors positioned at the respective source-to-detector spacing determined, wherein the positions of the detectors are configured to be dynamically repositioned along a longitudinal axis of the logging tool while the logging tool is disposed in the borehole;

acquiring logging data utilizing the logging tool with the plurality of detectors positioned at the respective source-to-detector spacing determined; and processing the acquired logging data utilizing the customized geologic formation model to determine one or more characteristics of the geologic formation.

19. The medium of claim 18, wherein determining a source-to-detector spacing for each of the plurality of detectors of the logging tool comprises determining a source-to-detector spacing for each of the plurality of detectors of the logging tool based at least in part on at least one of the following:

one or more characteristics of the geologic reservoir surrounding the borehole;

one or more characteristics of the borehole;

one or more characteristics of the neutron source;

one or more characteristics of the gamma ray detectors; and one or more characteristics of the geologic reservoir to be determined.

20. A non-transitory computer readable storage medium having program instructions stored thereon that are executable by one or more processors to cause the following steps for borehole logging:

identifying a set of logging conditions corresponding to logging of a borehole in a formation;

identifying a source-to-detector spacing for each of the plurality of detectors of the logging tool, the source-to-detectors spacing being identified based at least in part on the set of logging conditions corresponding to logging of a borehole;

providing for positioning each of the plurality of detectors of the logging tool at the respective source-to-detector spacings identified, wherein the positions of the detectors are configured to be dynamically repositioned along a longitudinal axis of the logging tool while the logging tool is disposed in the borehole;

identifying a logging model corresponding to the logging conditions and the logging tool having the plurality of detectors positioned at the respective source-to-detector spacings identified;

receiving logging data for the borehole from the logging tool having the plurality of detectors positioned at the respective source-to-detector spacings identified; and processing the logging data using the logging model to identify one or more characteristics of the formation.

* * * * *